INVENTORS
ESMOND P. G. WRIGHT &
JOSEPH RICE

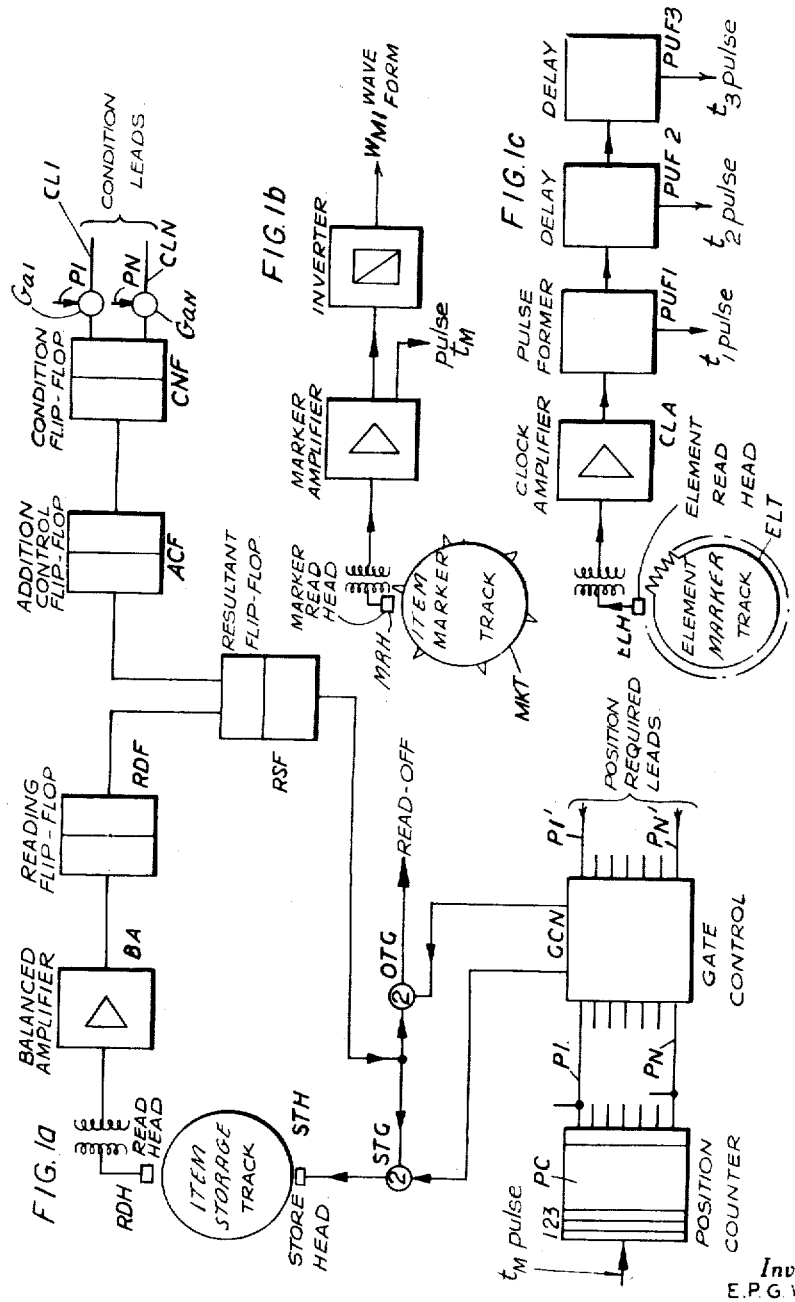

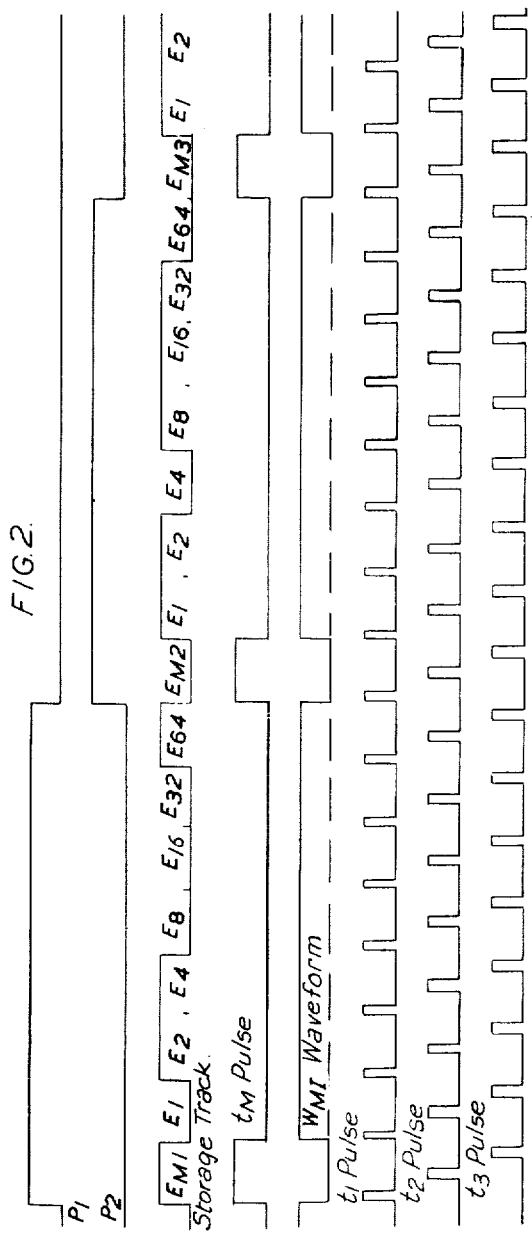

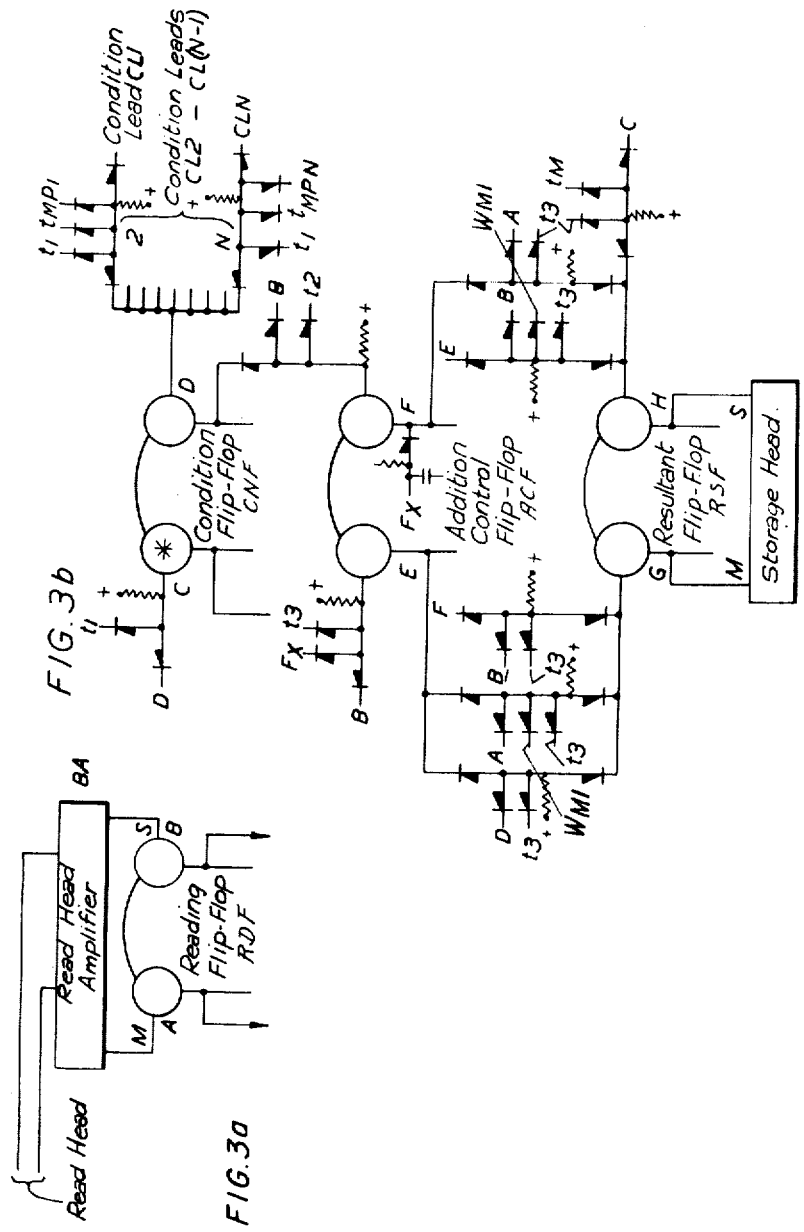

BY Robert Harding Jr
ATTORNEY

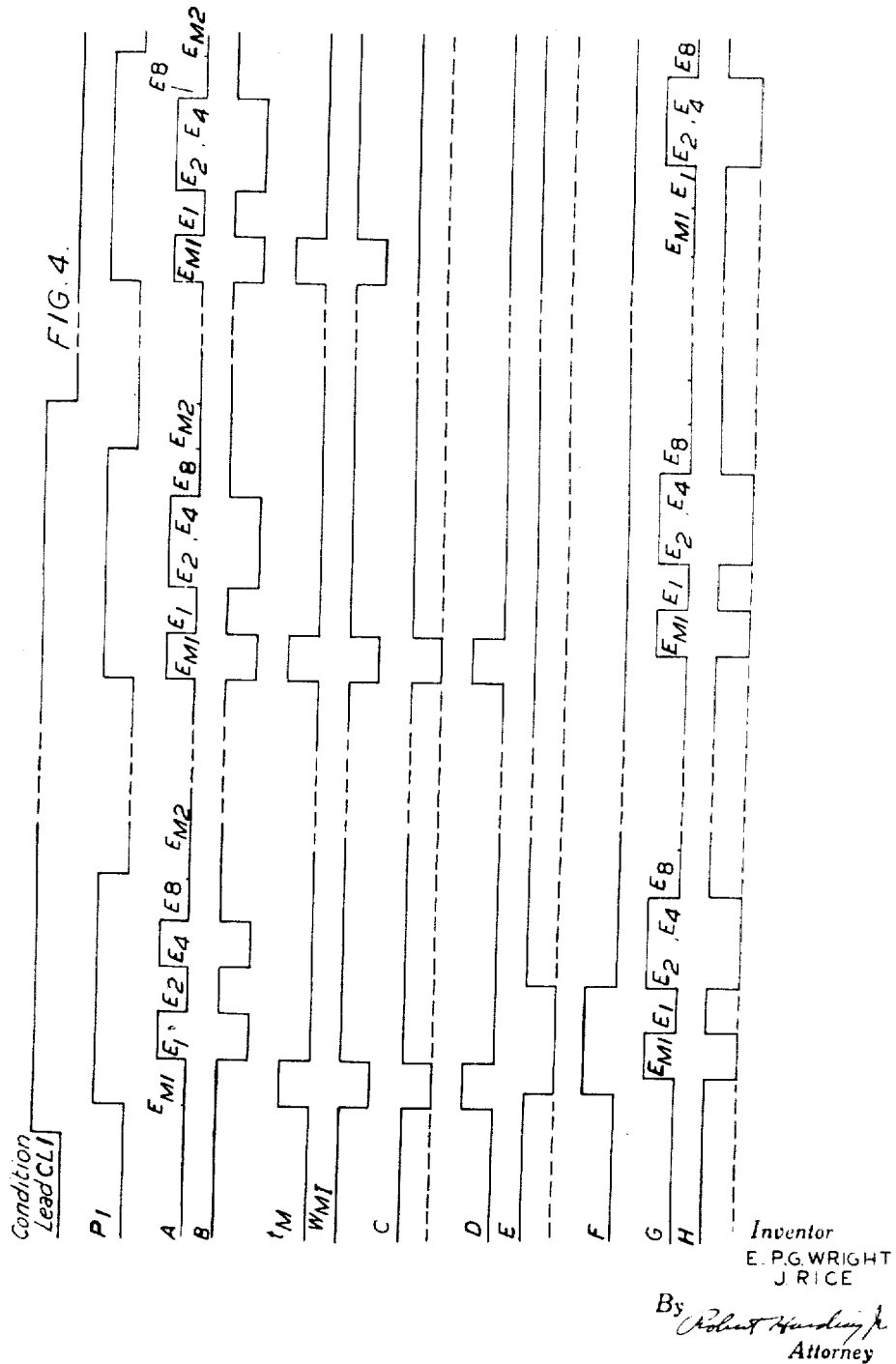

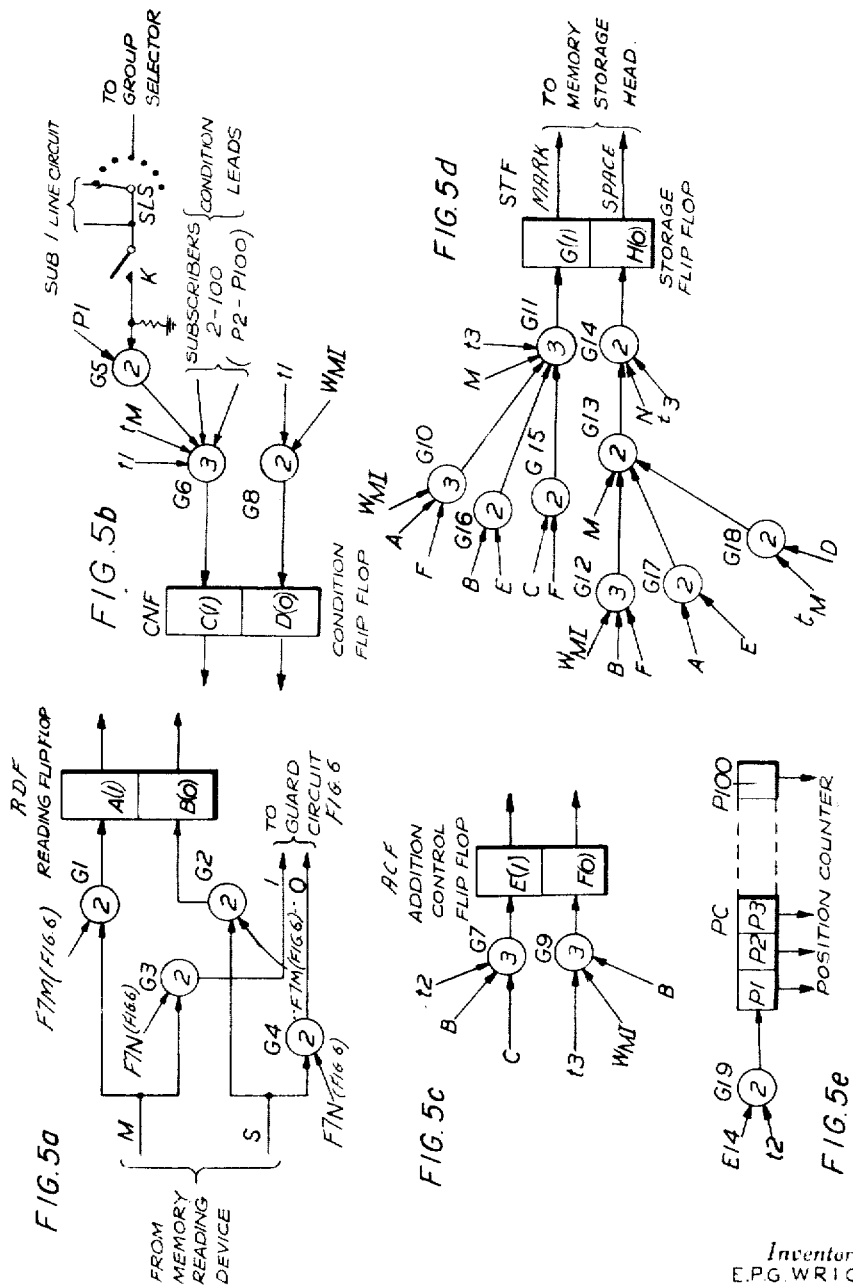

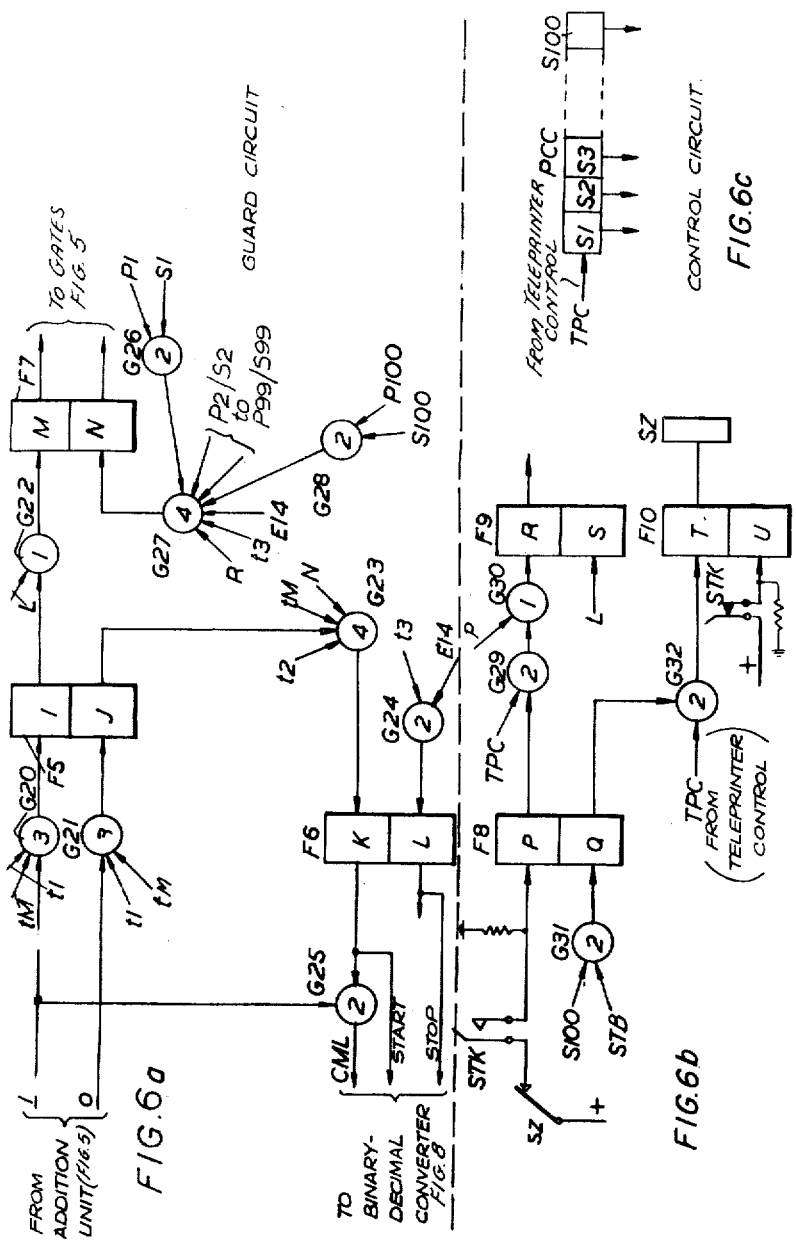

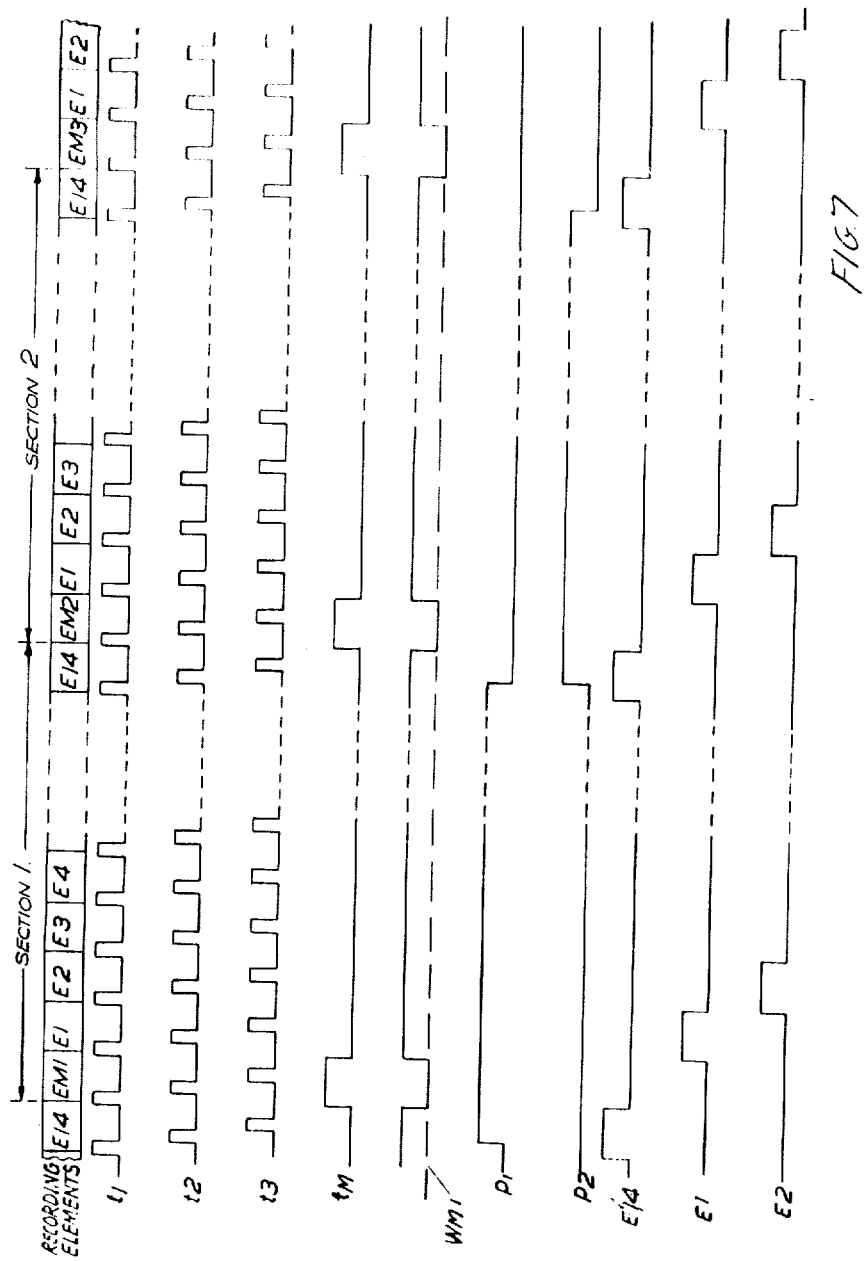

Dec. 23, 1958  E. P. G. WRIGHT ET AL  2,865,563
MESSAGE REGISTERS
Filed May 22, 1952  33 Sheets-Sheet 9
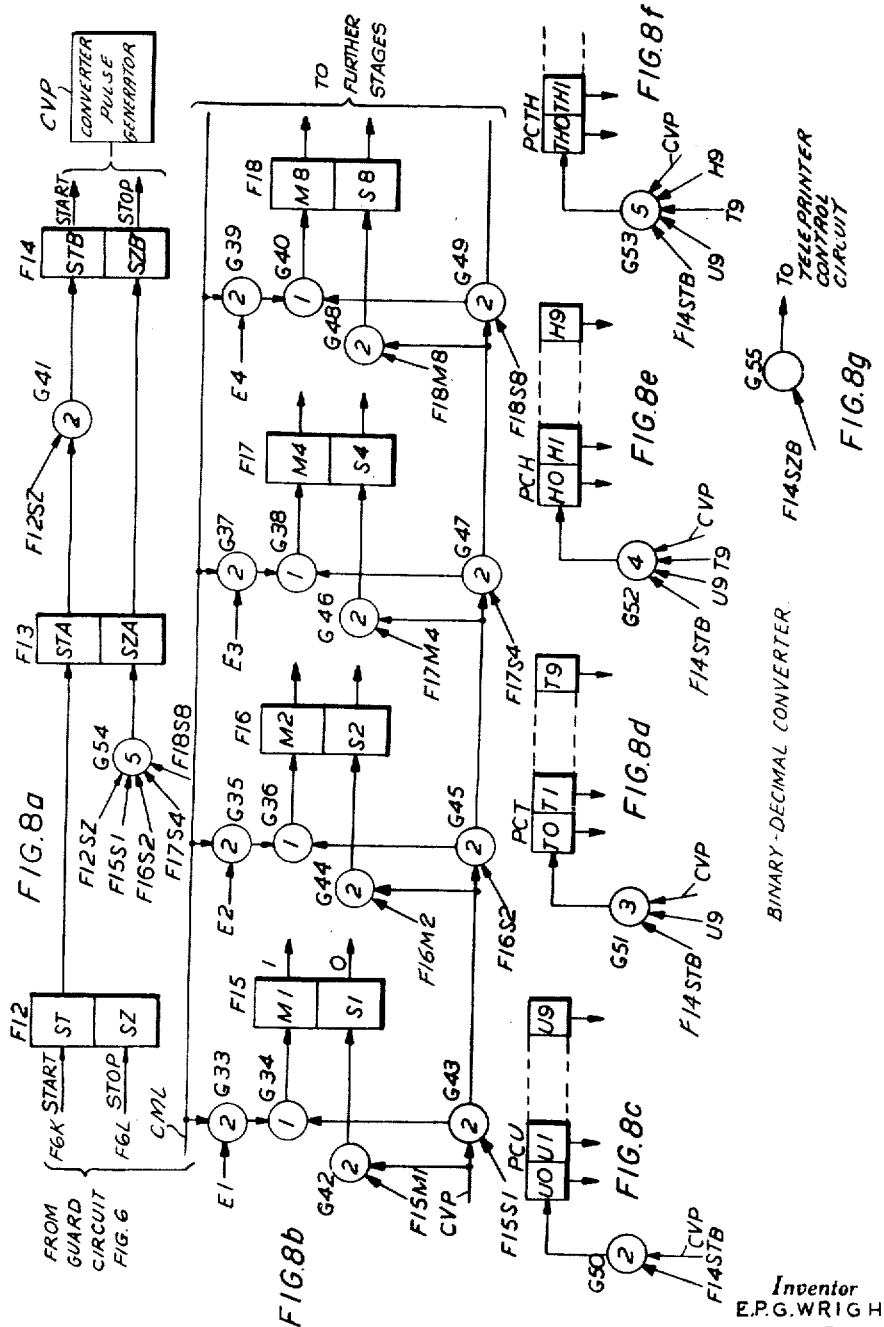
Inventor
E. P. G. WRIGHT
J RICE
By Robert Harding Jr.
Attorney

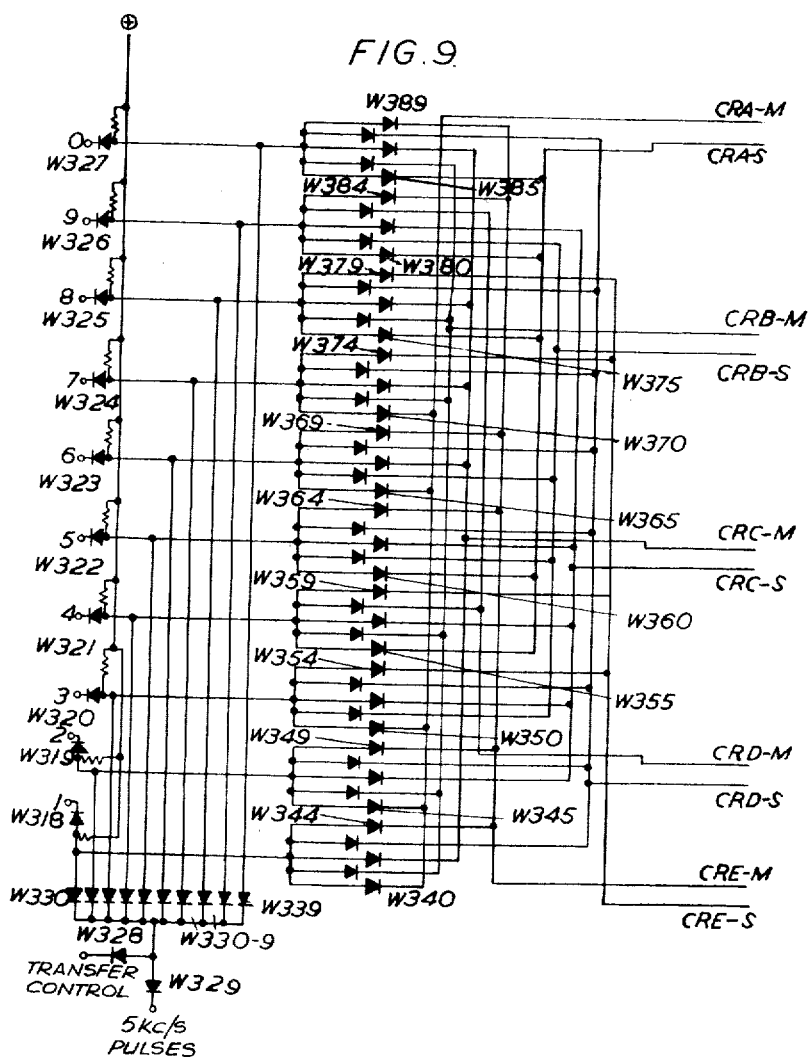

Dec. 23, 1958   E. P. G. WRIGHT ET AL   2,865,563
MESSAGE REGISTERS
Filed May 22, 1952   33 Sheets-Sheet 12
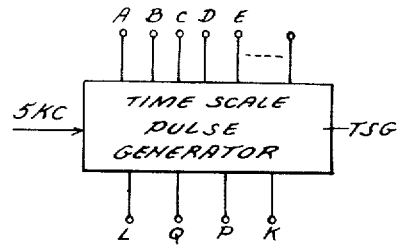
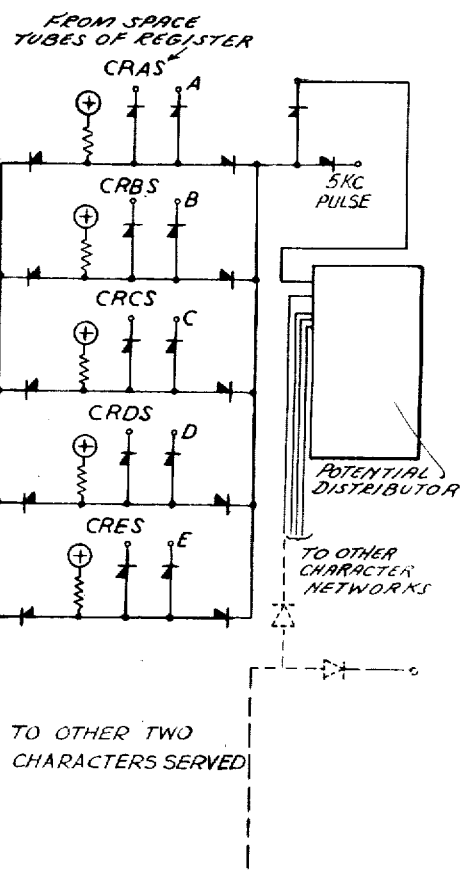
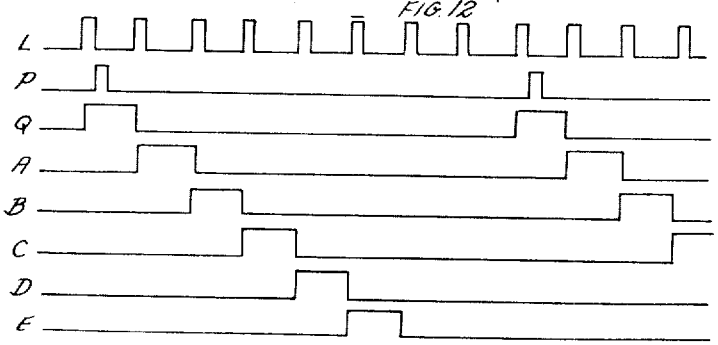
Inventor
E. P. G. WRIGHT
J. RICE
By
Attorney

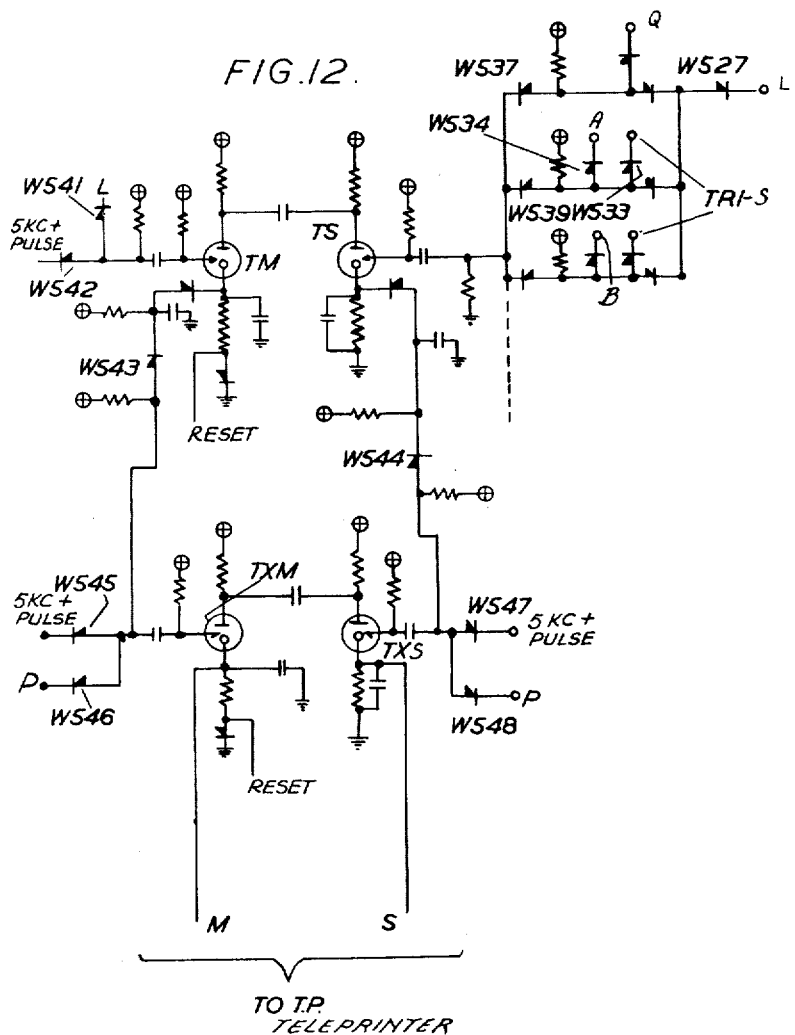

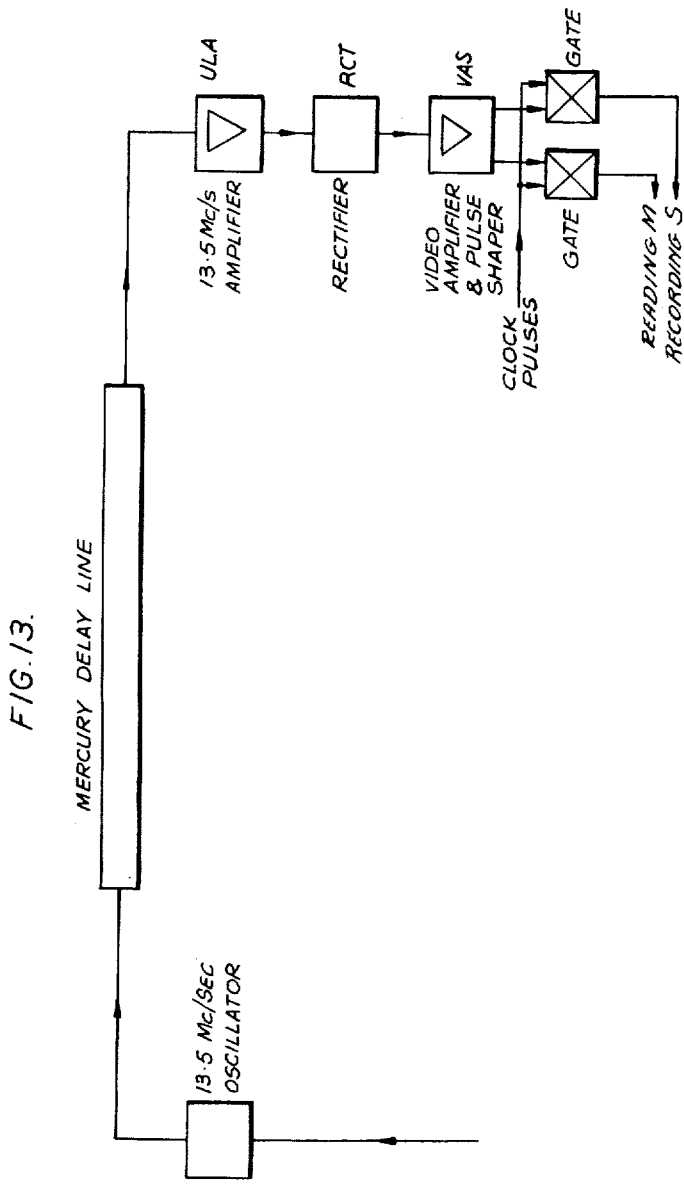

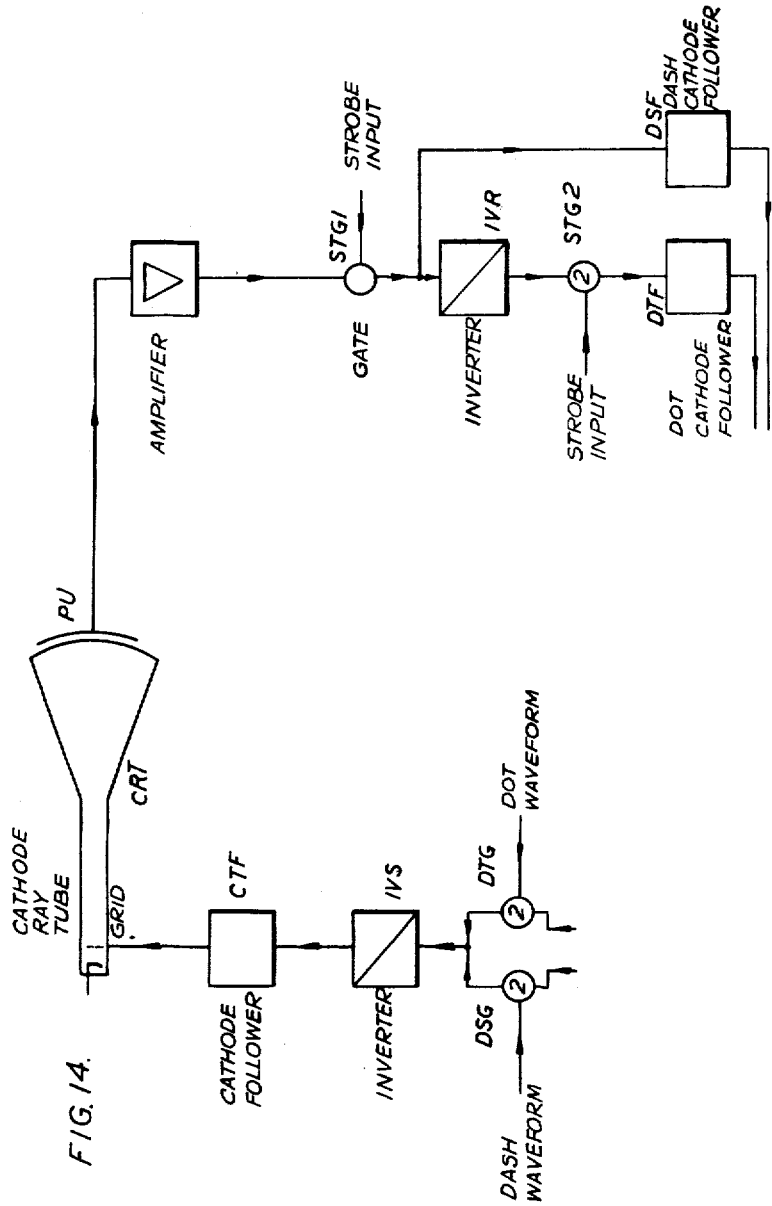

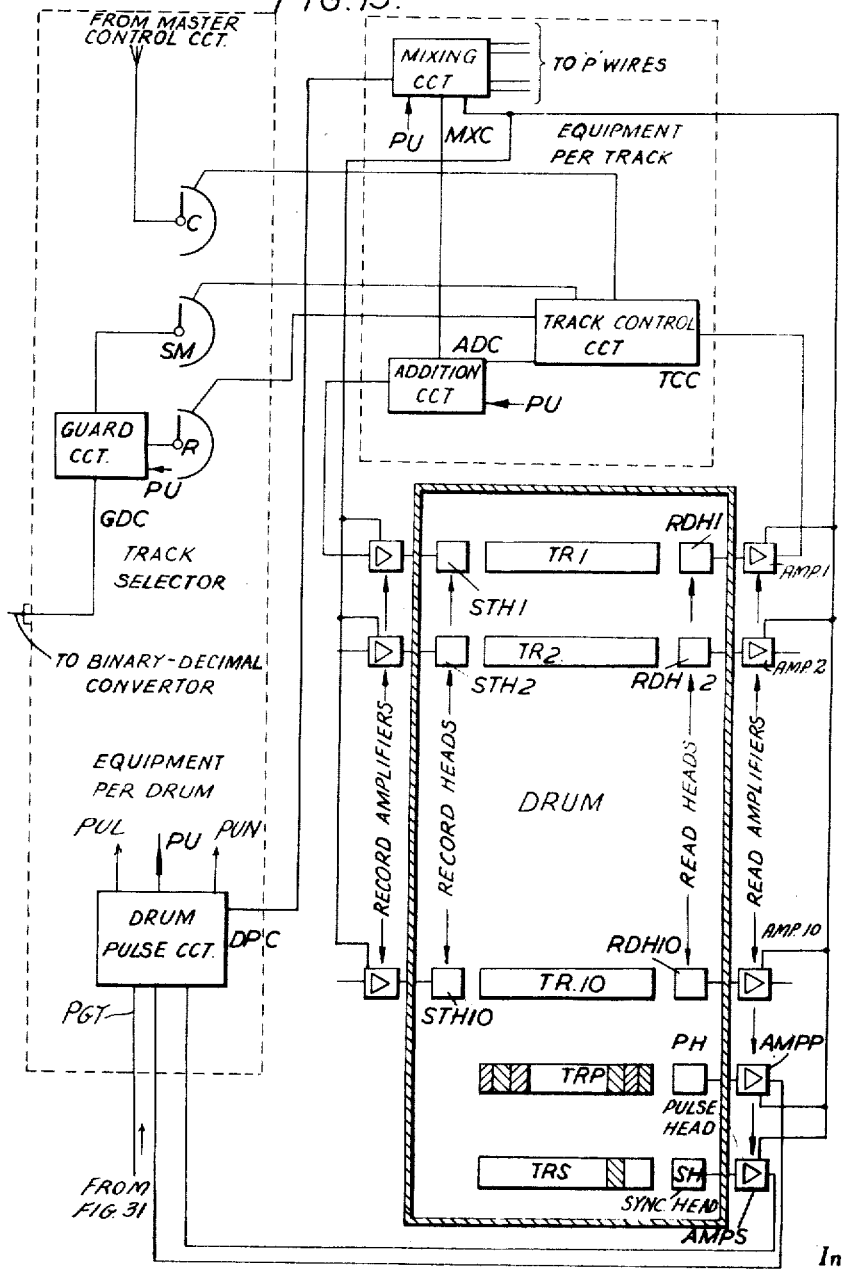

Dec. 23, 1958   E. P. G. WRIGHT ET AL   2,865,563
MESSAGE REGISTERS
Filed May 22, 1952   33 Sheets-Sheet 17
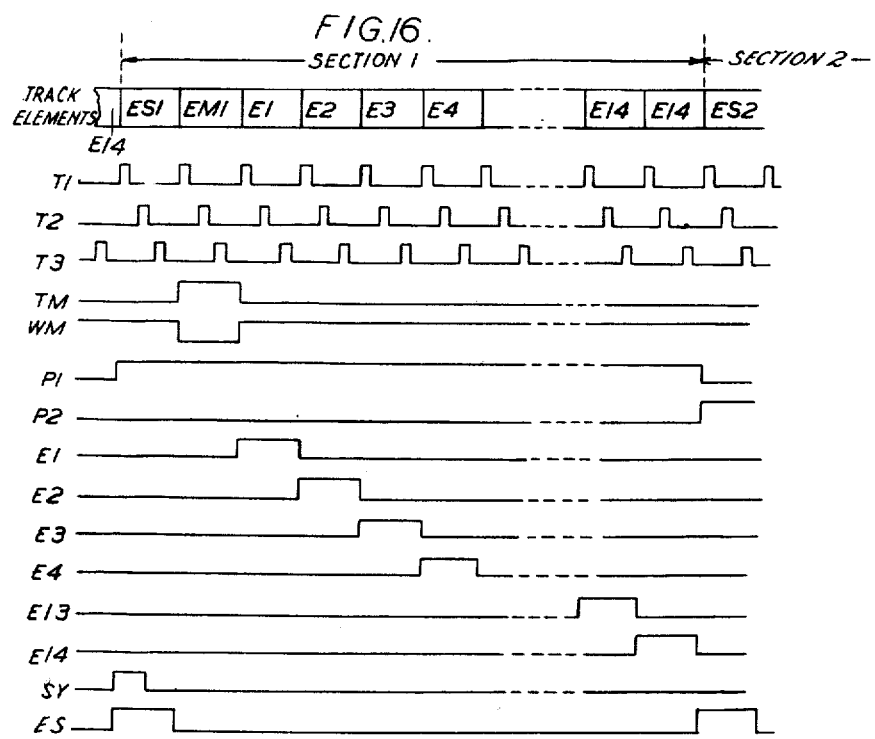
Inventor
E. P. G. WRIGHT-
J RICE
By Robert Hardy
Attorney

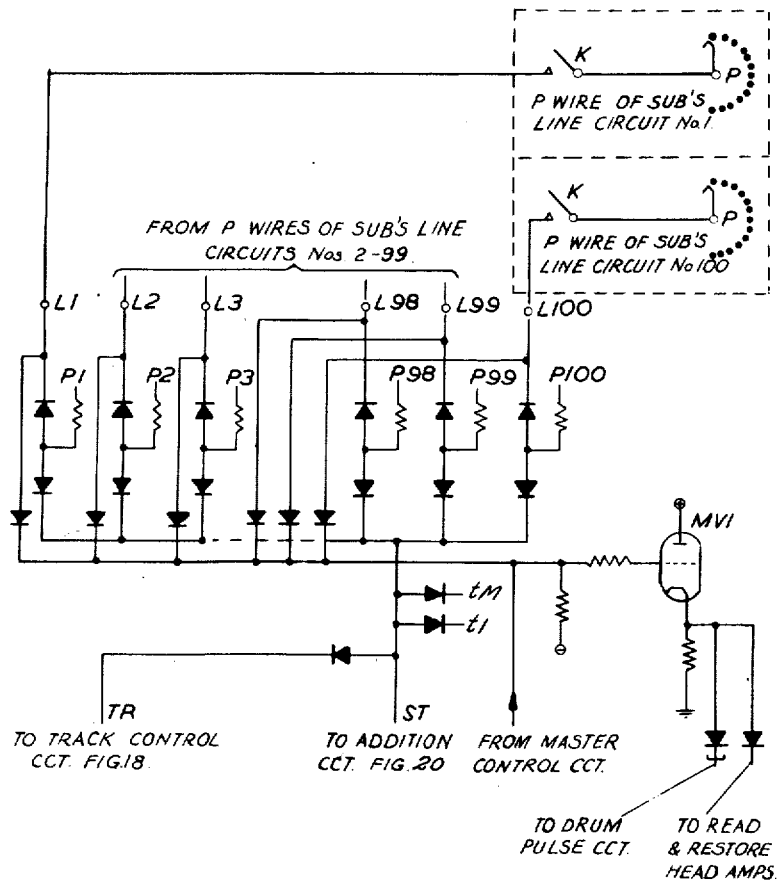

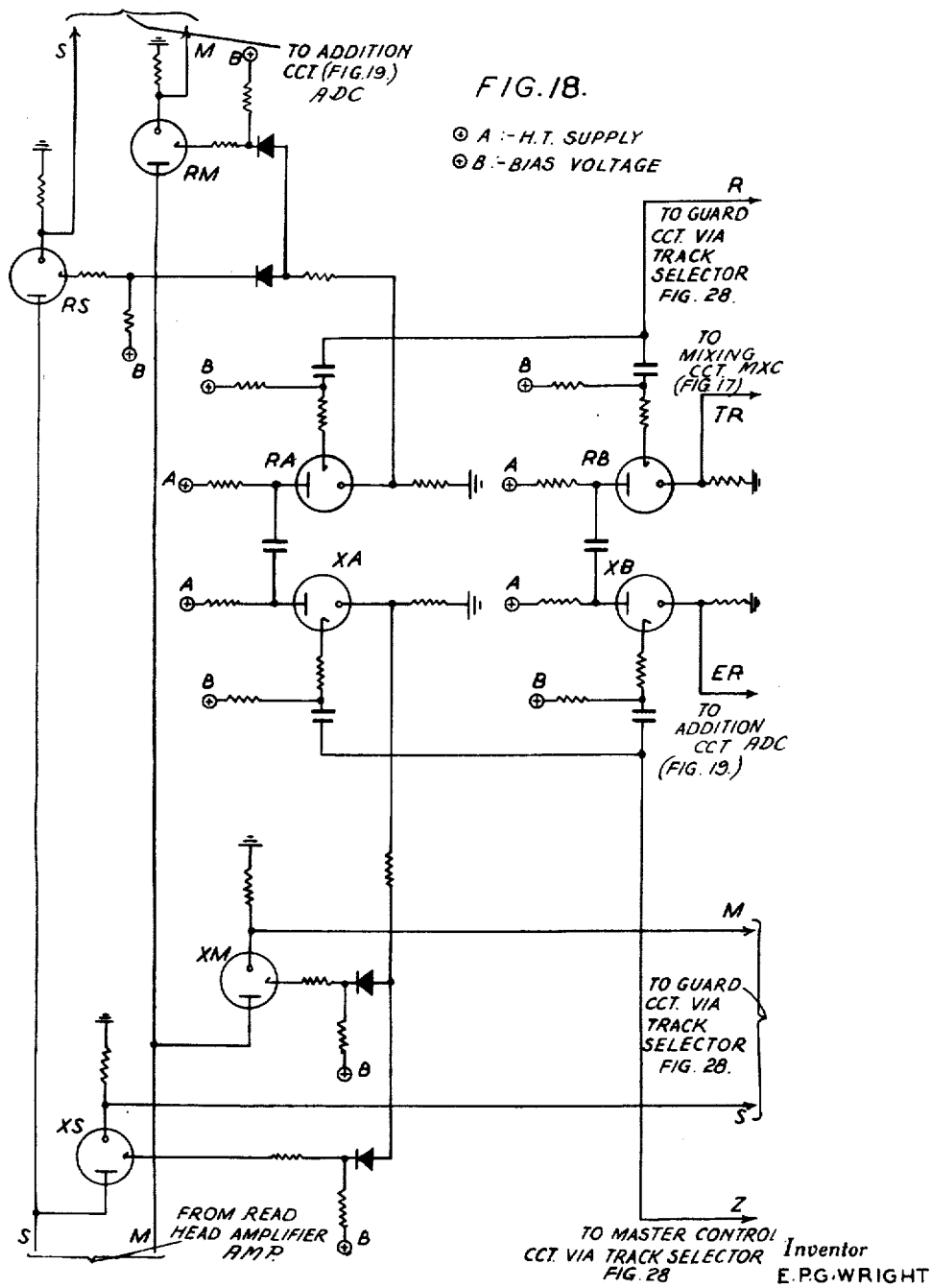

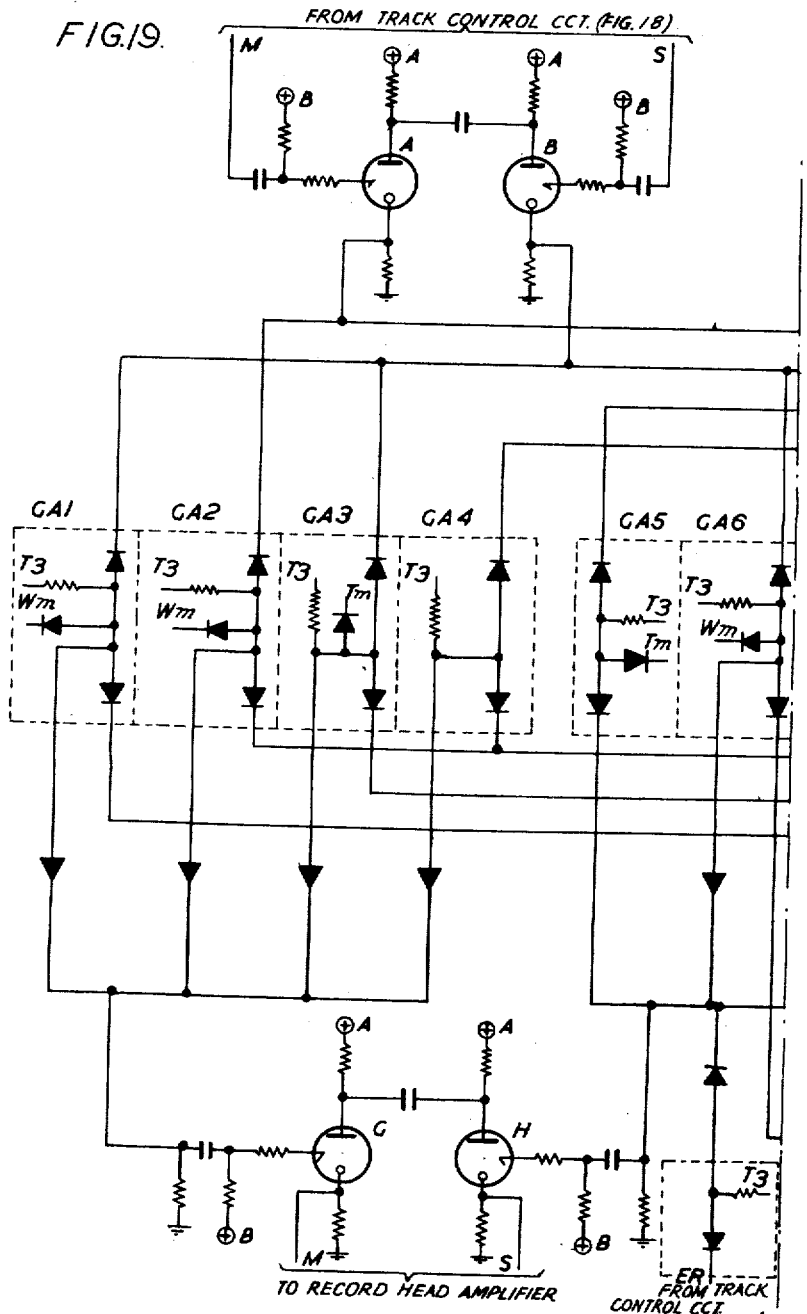

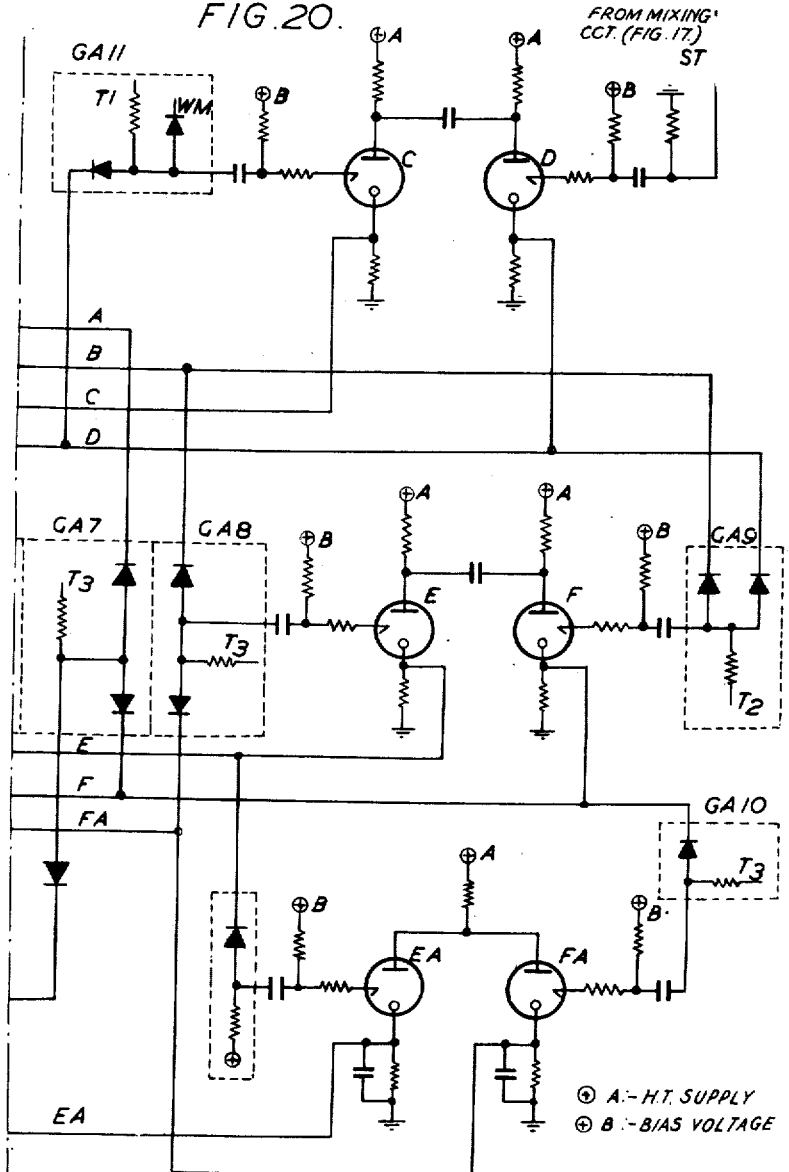

Dec. 23, 1958 E. P. G. WRIGHT ET AL 2,865,563
MESSAGE REGISTERS
Filed May 22, 1952 33 Sheets-Sheet 22
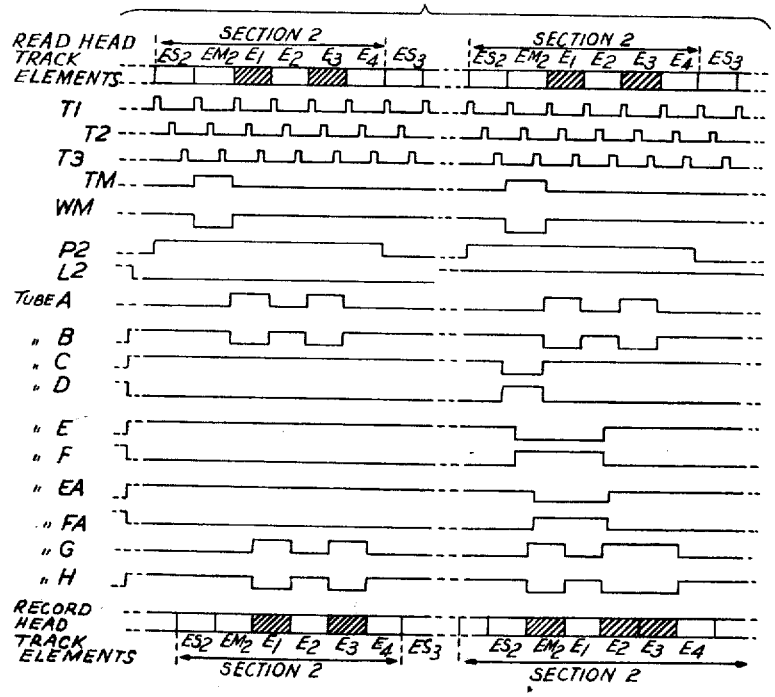
Inventor
E. P. G. WRIGHT-
J. RICE
By
Attorney

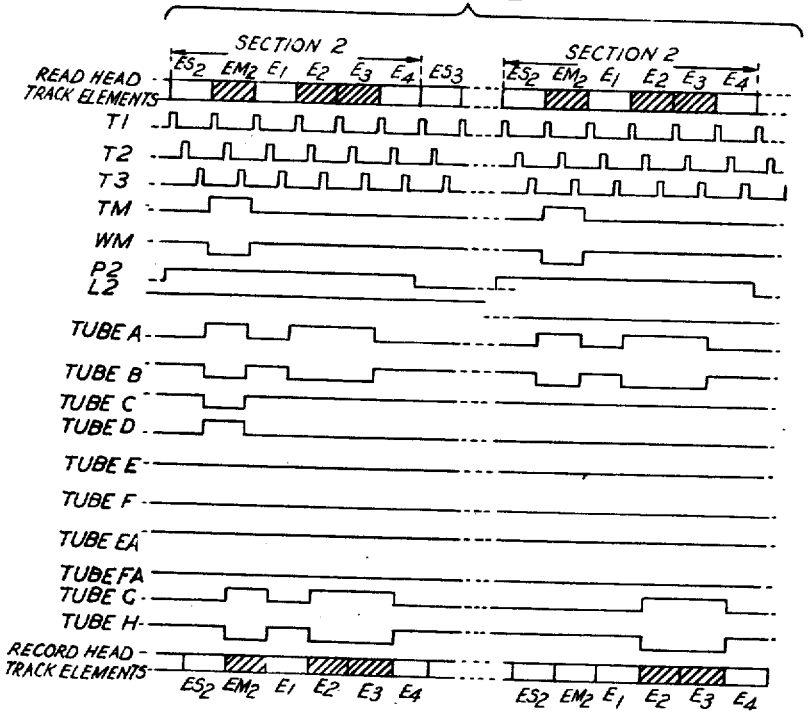

Dec. 23, 1958  E. P. G. WRIGHT ET AL  2,865,563
MESSAGE REGISTERS

Filed May 22, 1952   33 Sheets-Sheet 24

Inventor
E. P. G. WRIGHT-
J. RICE
By
Attorney

Dec. 23, 1958     E. P. G. WRIGHT ET AL     2,865,563
MESSAGE REGISTERS
Filed May 22, 1952     33 Sheets-Sheet 25

Inventor
E. P. G. WRIGHT -
J. RICE
By Robert Harding Jr.
Attorney

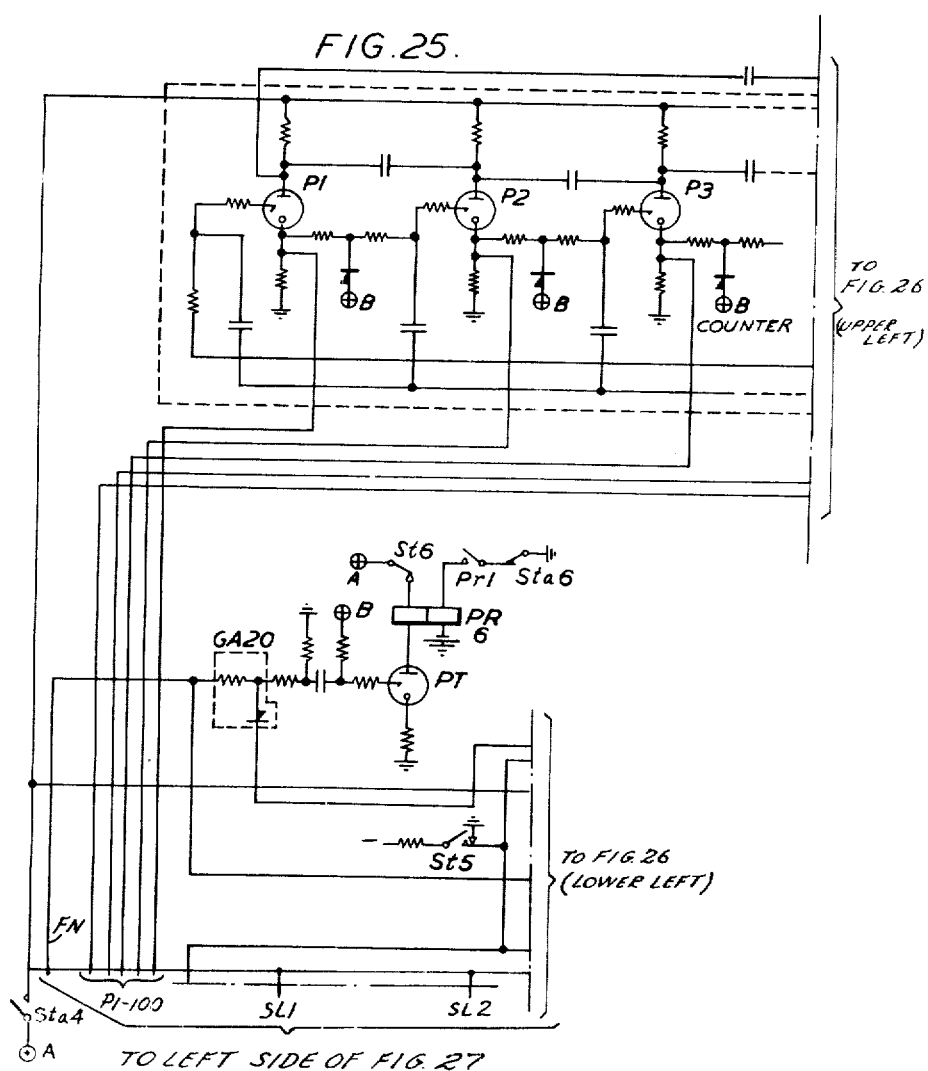

Dec. 23, 1958  E. P. G. WRIGHT ET AL  2,865,563
MESSAGE REGISTERS
Filed May 22, 1952  33 Sheets-Sheet 30
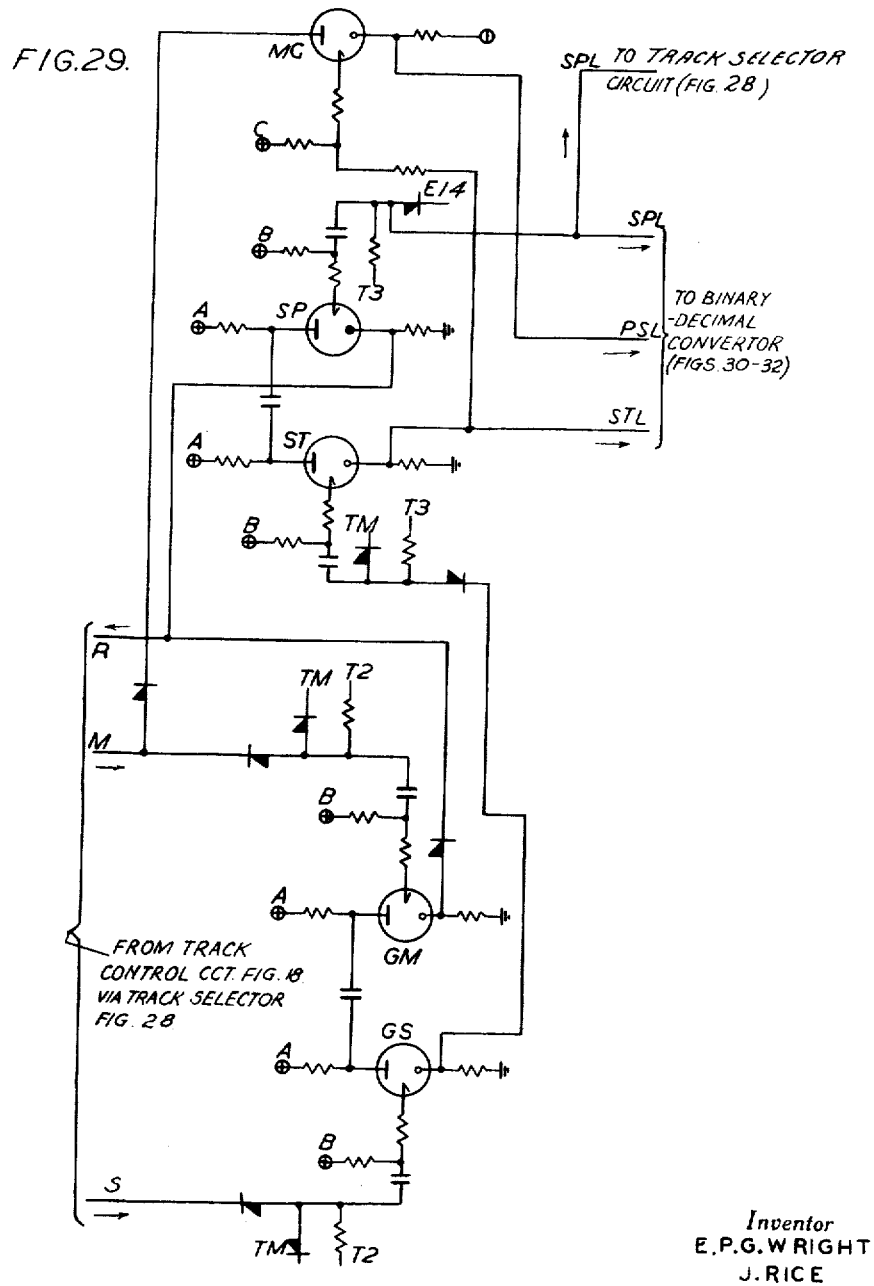
Inventor
E.P.G. WRIGHT –
J. RICE
By
Robert Harding
Attorney Dec. 23, 1958        E. P. G. WRIGHT ET AL        2,865,563
MESSAGE REGISTERS
Filed May 22, 1952                                33 Sheets-Sheet 31
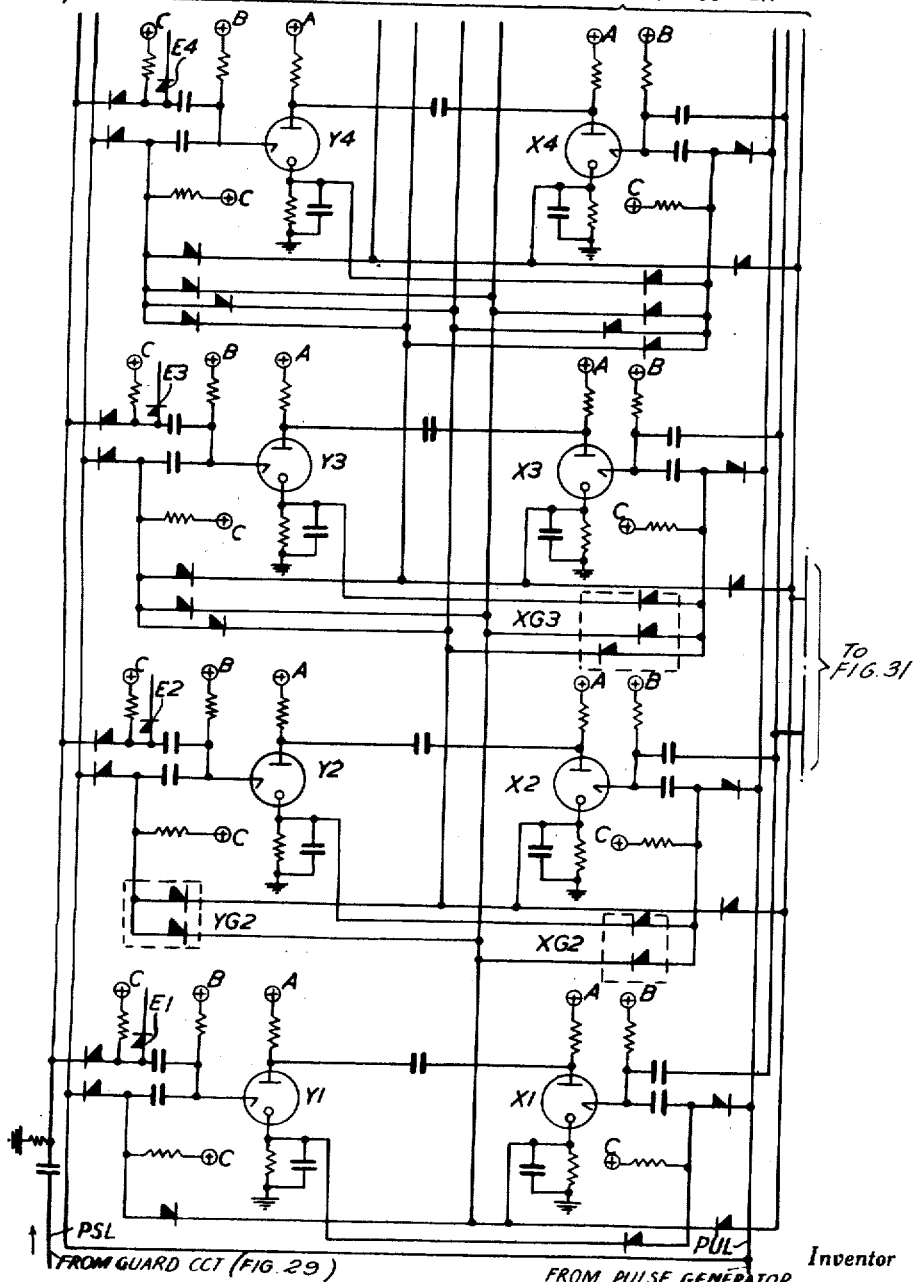
Inventor
E.P.G. WRIGHT
J. RICE
By
Robert Harding Jr.
Attorney

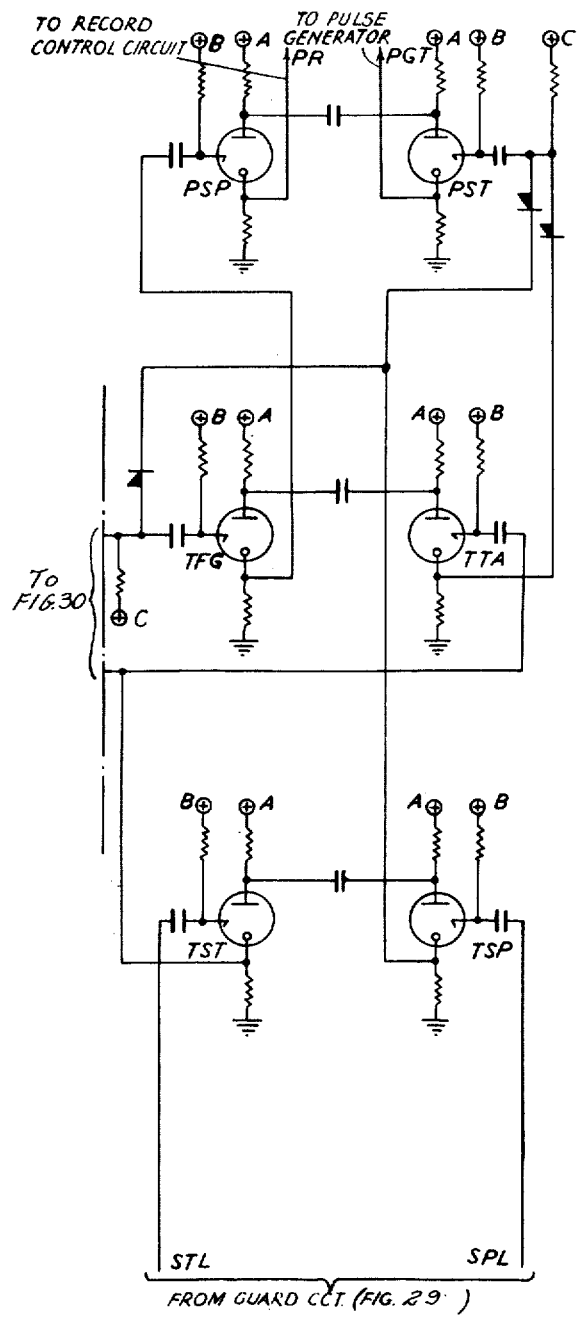

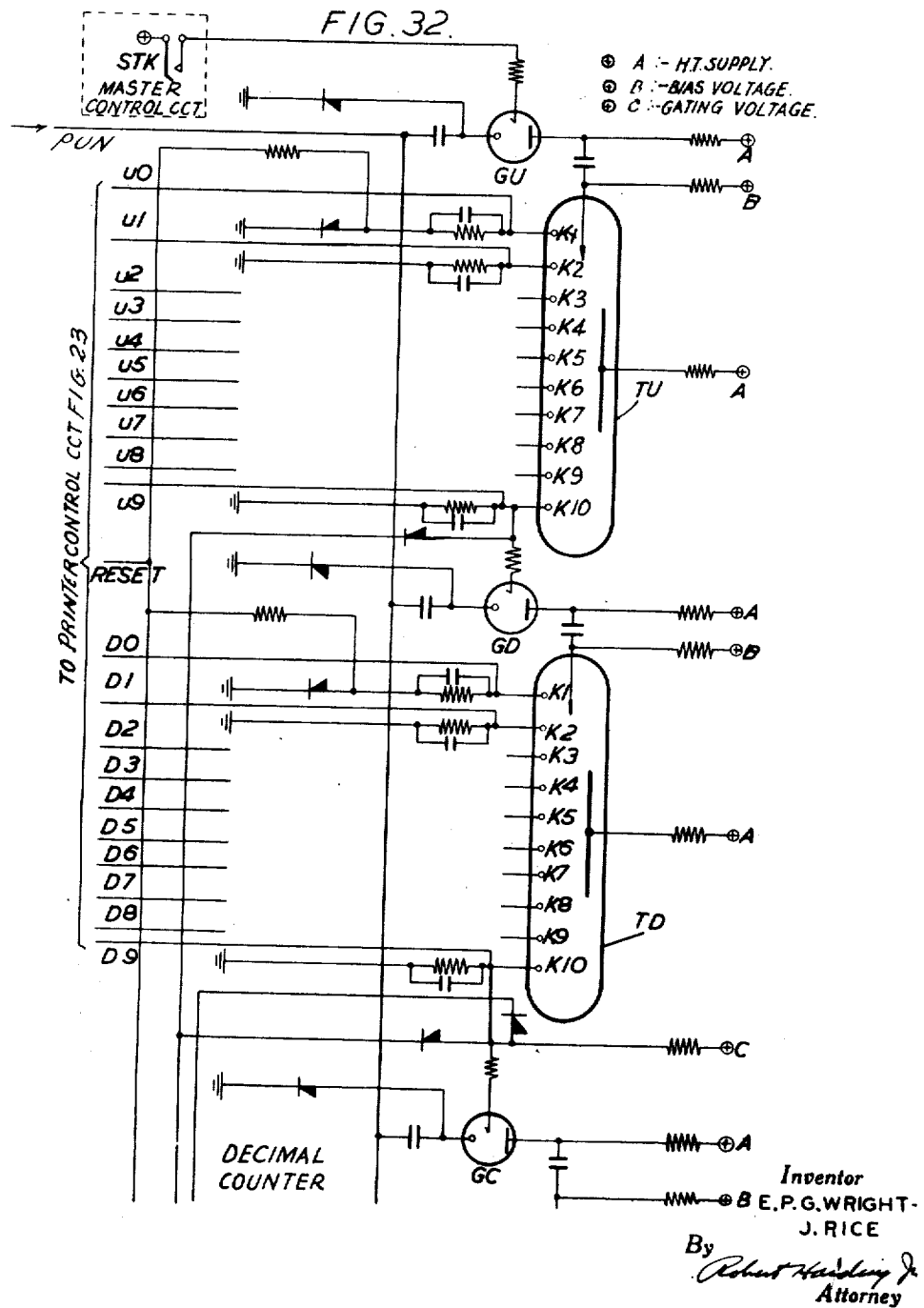

United States Patent Office 2,865,563
Patented Dec. 23, 1958

2,865,563
MESSAGE REGISTERS

Esmond Philip Goodwin Wright and Joseph Rice, London, England, assignors to International Standard Electric Corporation, New York, N. Y.

Application May 22, 1952, Serial No. 289,386

Claims priority, application Great Britain May 23, 1951

8 Claims. (Cl. 235—61)

This invention relates to telephone subscribers' message registers, and has for its object a form of message registration which eases the problem of reading the registers and billing subscribers.

One feature of the invention comprises a telephone subscriber's message register on which a cumulative total is stored in binary notation.

A second feature of the invention comprises a telephone subscriber's message register comprising a magnetizable track, a storage head, a read head, and means between said read head and said storage head for adding to the total stored thereon.

A third feature of the invention comprises a telephone subscriber's message register from which a cumulative total can be directly read in electrical form.

The storage equipment can be of any suitable kind, such as magnetic line recorders, e. g. tape or drum; sonic delay line stores, e. g. mercury delay lines; position storage tubes, such as deflector type cathode ray tubes; electromagnetic transmission line stores, such as the resistance-capacity lines used in radar; electromagnetic delay line storage, such as gas tube, hard valve, saturated core, and other pattern movement devices. Examples of storage equipment using magnetic drums, mercury delay lines, and cathode ray tubes will be described.

Each embodiment comprises a storage medium with storing and reading heads and means between said heads for modifying information passing from the reading head to the storing head. The modification can be by way of addition, subtraction or other mathematical operation.

The invention is also applicable for register controllers or register-translators in telecommunication exchange systems.

It is also applicable to seat-booking systems, for instance, for aircraft or railway services, theatres, etc.

The above-mentioned and other features and objects of this invention and the manner of attaining them will become more apparent and the invention itself will be best understood by reference to the following description of an embodiment of the invention taken in conjunction with the accompanying drawings, in which:

Figs. 1a, 1b, and 1c show a general schematic diagram of one embodiment of the present invention;

Fig. 2 represents in time relationship certain of the controlling waveforms encountered in the arrangement of Fig. 1;

Figs. 3a and 3b show a schematic diagram of the circuit of Figs. 1a, 1b, and 1c;

Fig. 4 shows the waveforms encountered in the circuit of Fig. 3;

Figure 3C:
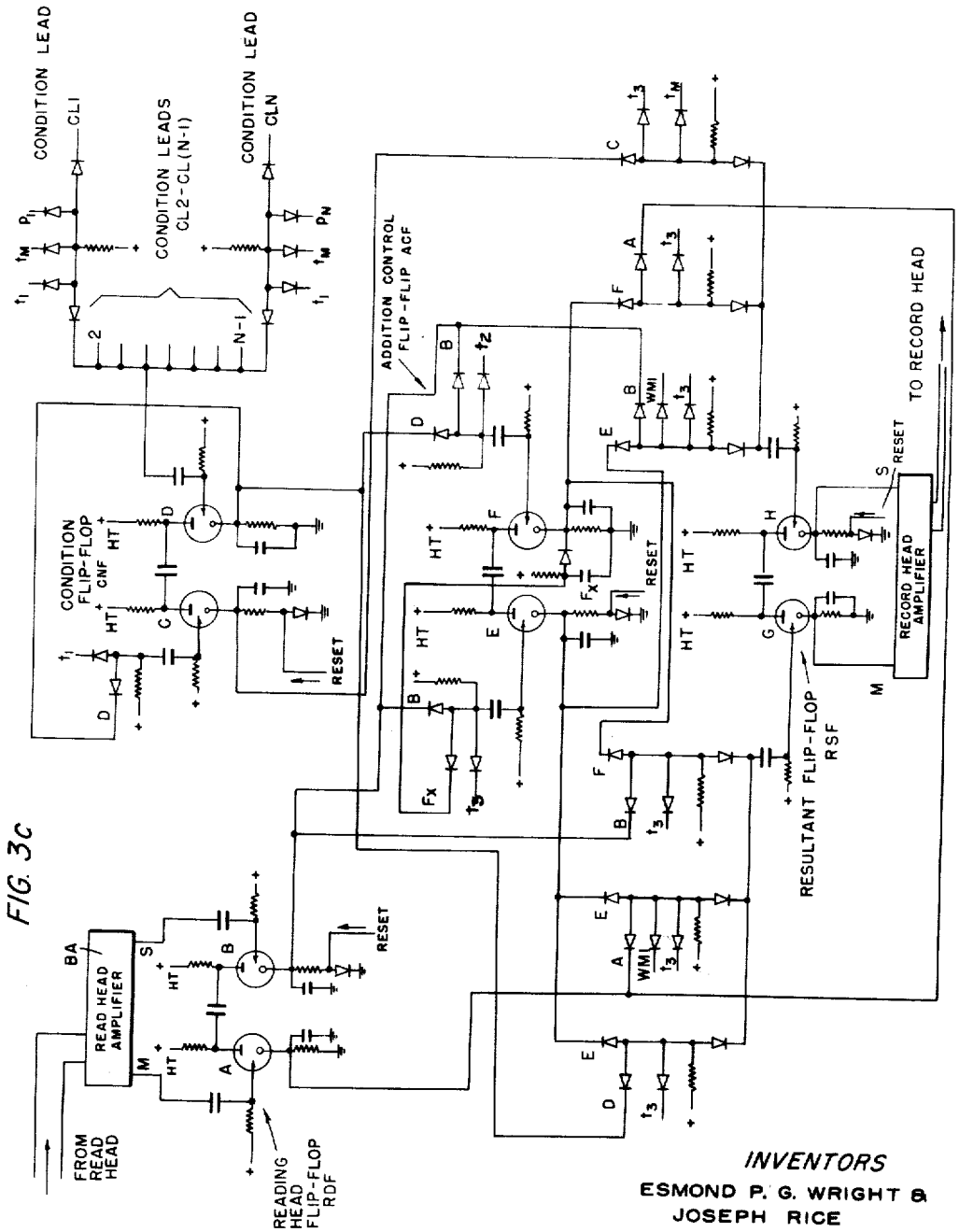
Fig. 3c shows a more detailed circuit diagram of the circuit arrangement of Figs. 1a, 1b, and 1c for effecting the operation of the reading and storage heads.
Figure 23:
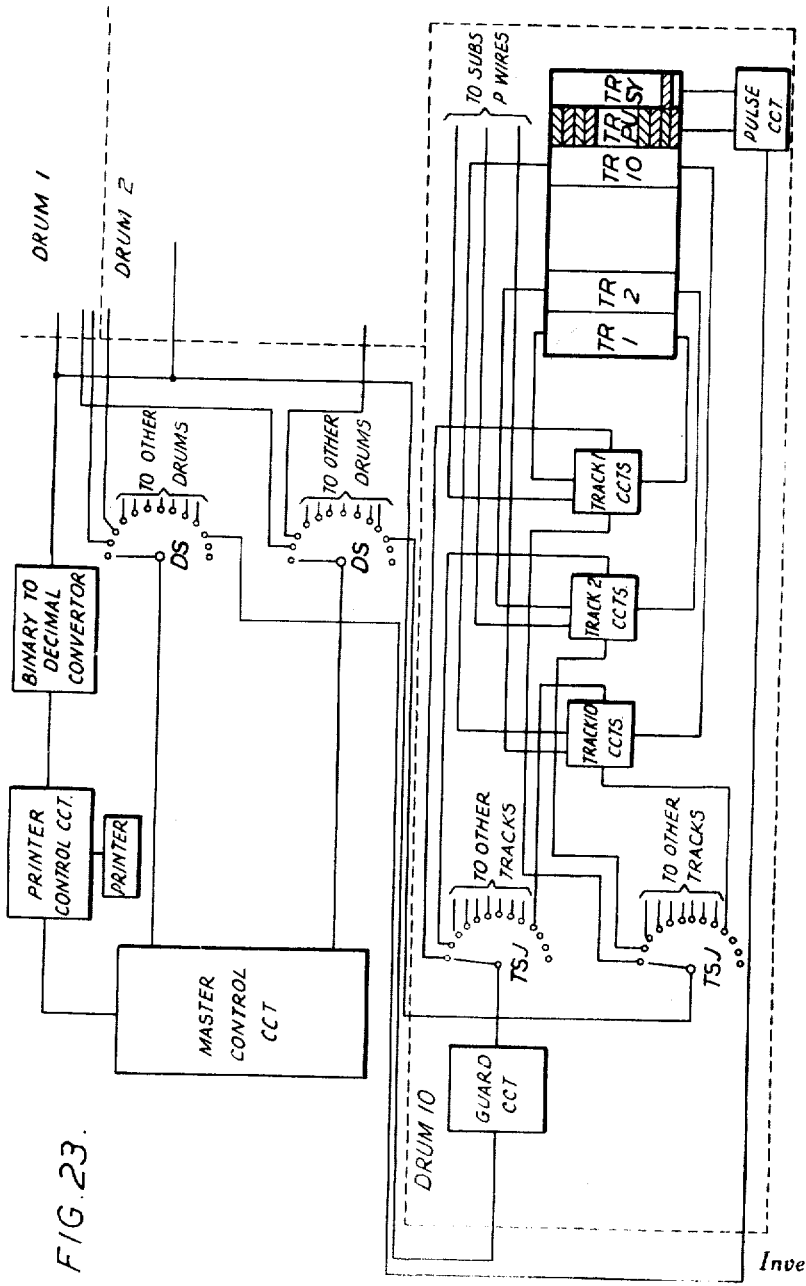
Figure 26:
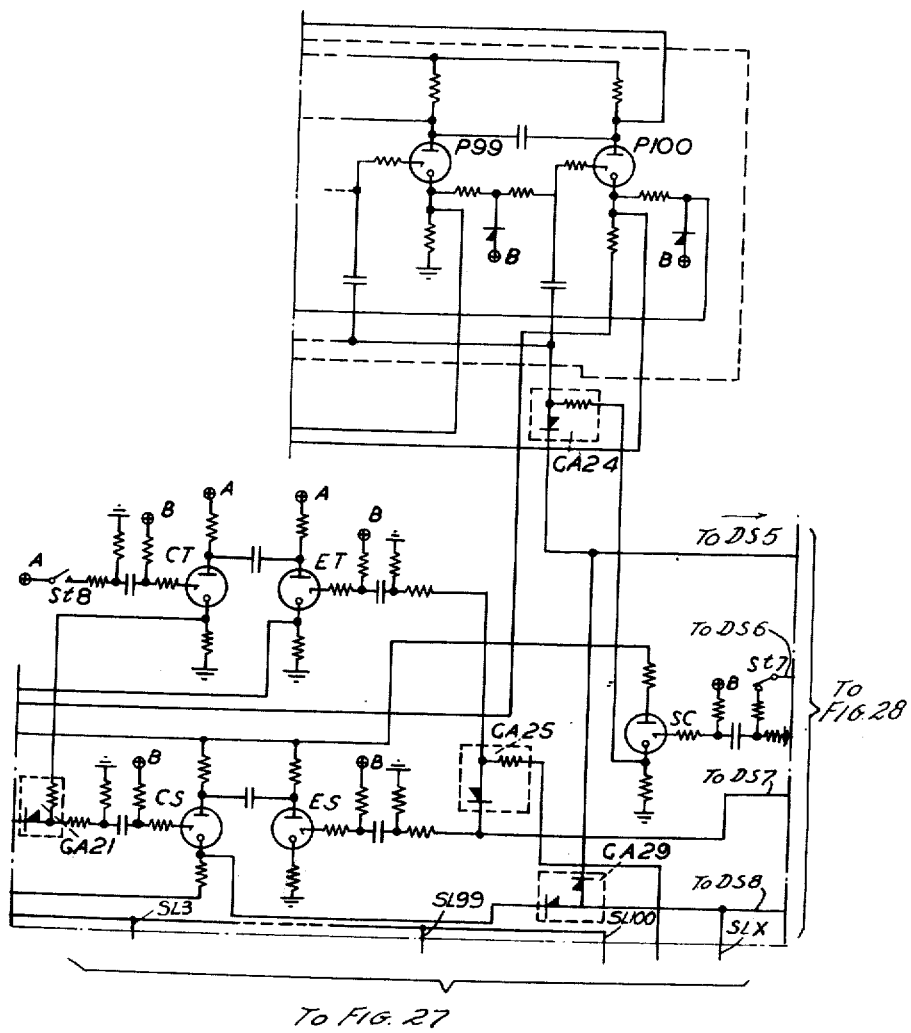

Figs. 5a, 5b, 5c, 5d, and 5e show a modification of the circuits of Figs. 3a and 3b;

Figs. 6a, 6b, and 6c show circuits for use in recording a stored number from a reading head on a teleprinter via a binary-to-decimal converter;

Fig. 7 shows the waveforms encountered in the circuits of Figs. 5a to 5e, 6a to 6c;

Figs. 8a to 8g show a binary-to-decimal converter;

Figs. 9, 10, 11a, 11b, and 12 show circuits for converting decimal records into teleprinter code for printing;

Fig. 12a shows the wave forms encountered in the circuit of Fig. 11;

Fig. 13 shows a schematic circuit of an embodiment of the invention using mercury delay line storage, while Fig. 14 shows a schematic circuit of another embodiment of the invention using cathode ray tube storage;

Fig. 15 is a schematic layout of the equipment required for recording metering information on a magnetic drum and for changing and reading off such information;

Fig. 16 shows pulse time cycles derived from the magnetic drum of Fig. 15;

Fig. 17 shows a mixing circuit provided for each one of a large number of parallel circular magnetic tracks on the drum, each of which records the metering information for a group of substations;

Fig. 18 shows a track control circuit one of which is provided for each magnetic track;

Figs. 19 and 20, which should be placed side by side with Fig. 19 on the left, together show an addition circuit one of which is provided for each magnetic track;

Figs. 21 and 22, which should be placed side by side with Fig. 21 on the left, show the operation chart for the addition circuit of Figs. 19 and 20;

Fig. 23 shows a schematic layout for metering equipment comprising several drums;

Figs. 24a, 24b, and 25 to 28 show the master control circuit for a group of drum metering circuits;

Figs. 24–26 and 28 should be arranged side by side from left to right in ascending order of numbers with Fig. 27 below Figs. 25 and 26;

Fig. 29 shows a guard circuit, only one of which is provided per drum; and

Figs. 30 and 31, which should be placed side by side, and Fig. 32, together constitute a binary-to-decimal converter.

In the drawings, certain of the figures are purely schematic, and the different electronic circuit tools are indicated by rectangles or circles with a schematic-indication in some cases of their purpose. For instance, a flip-flop circuit is represented by two rectangles side-by-side, a counting circuit by a series of rectangles and so on. Electronic gates are indicated by small circles with a plurality of incoming leads and an outgoing lead: the figure, e. g. 2, inside the circle indicates that coincidence of potentials on that number of incoming leads is required to open the gate and apply potential to the outgoing lead.

In the first embodiment of Figs. 1 and 3 the device to be used for storing a plurality of items of information is a rotating magnetic drum which may consist of a nickel-plated brass cylinder. On the surface of the drum are a number of parallel tracks, the tracks going round the periphery of the drum. The number of tracks on the drum is dependent upon the storage requirements. Each track has a read head and a storage head, the two heads being connected together via electronic control equipment.

A track may be considered as composed of a number of element positions, each capable of recording a "north-south" or "south-north" magnetic record. In practice it is possible to have up to 150 elements per inch round the periphery. For example, a drum of 2 inches diameter, i. e. approximately 6 inches circumference, may have 900 elements per track and, if the maximum value to be stored for the individual items of information requires 20 elements arranged in binary form, the track may be used for storing 45 independent items in 45 successive sections around the track. For additional independent items the number of tracks would be increased accordingly and separate heads and control equipment added.

Consider another example in which the maximum item to be stored is the decimal number, 10,000, and the number of individual items is to be 1,000. Using a binary method of storage any decimal number up to 10,000 may be represented by using 14 binary elements. If it is desired to have 100 items per track, the required elements per track will be 1,400 and, using a packing of 100 elements per inch of periphery, the circumference of the drum would be 14 inches (approximately 4½ inches in diameter). Ten such tracks would be required, and if the tracks have a separation of ½ inch between centers, the axial length of the drum would be approximately 6 inches. Each track would have its own read and store heads and control equipment. The heads are mounted so that they just clear the drum.

The read head reads, in turn, the elements passing the read head and transfers them either directly or after suitable modification to the store head which would cause the original or modified value to be recorded. The two heads are preferably placed diametrically opposite on the same track, which means that two independent element trains on the track must be allocated for each individual item and the item must be recorded in each element train. It would be possible to arrange the heads so that a new storage is overprinted on the original position, but it is considered that by using two positions, the control equipment may be simplified. The heads may be placed in any other suitable relative positions.

Figs. 1a, 1b, and 1c represent a schematic drawing of the first embodiment, showing the equipment required for one item storage track on the magnetic drum. In addition to the item storage track, two other tracks are necessary, one for producing a pulse to mark each item which appears on the item storage track, which track may be called the "item marker track" and is designated MKT, and the other for producing a pulse to mark each element which appears on the item storage track, which may be called the "element marker track" and is designated ELT. These three tracks are represented in Figs. 1a, 1b, and 1c, respectively by separate circles.

The item storage track is so labelled in Fig. 1a and has reading and store heads RDH and STH. The item marker track MKT, common to all the storage tracks, if others are provided, gives the starting positions for the various storage sections. This track has permanently magnetized element positions coinciding with the first elements of the storage sections on the storage tracks. Such elements may be provided by toothlike projections made on the periphery of the marker track which is then magnetized. The item marker track MKT is provided with a read head MRH. The element marker track ELT also has magnetized toothlike projections, one for each element on the item storage track.

The output from the marker read head MRH produces a marker pulse $t_M$ each time a tooth on the drum passes the head, which pulse is amplified by the marker amplifier and used to operate a position counter PC which has one position for each storage section on the storage track. The position counter PC has outputs P1 . . . PN, one for each position, and the counter applies potentials in succession to these outputs in response to the receipt of a succession of marker pulses $t_M$. Such a counting circuit is well known. The outputs P1 . . . PN from the position counter PC are used to scan in turn the input leads CL1 . . . CLN to the condition flip-flop CNF. To this end the ouputs P1 . . . PN are connected respectively to gates Ga1 . . . GaN in the input lead circuits, each of which gates can only open to permit a potential on the associated input lead CL1 . . . CLN to affect the conditon flip-flop when a potential appears on the corresponding P1 . . . PN output. If one of these gates opens to permit a potential on the associated CL lead to reach the flip-flop CNF, the right side of the flip-flop is turned "on" (if it is not already "on") and the left side is turned "off."

The circuits used for controlling the various flip-flops will depend upon the particular application for which the equipment is to be used. It may be required, for instance, to add 1 to a value read by the read head whenever a condition signal appears on the relative control lead, e. g. CL1, or to pass on the previous value if the condition signal is absent. Alternatively, it might be required to add or subtract any required figure signalled via the input leads. In this case the circuit would be similar to the converter arrangement described in our copending U. S. patent application Serial No. 198,326, filed November 30, 1950, now abandoned.

The rotational speed of the drum must be such that all conditions leads CL1 . . . N are scanned in the time of the shortest conditional control on the said leads. For example, in a subscriber metering application for a telephone exchange, when a subscriber is calling, a metering condition appears on a particular wire connected to the subscriber's line, called "the subscriber's P-wire," for not less than 250 milliseconds. Thus all the independent values on one track must be scanned in not more than 250 milliseconds. It is proposed to read the values on one part of the track and transfer them, modified or direct, to the opposite part of the drum. This means that one half only of the drum periphery must be scanned in the control signal time; the speed of the drum must be not less than $$\frac{1,000}{250} \times 2 \times 60 = 120 \text{ R.P.M.}$$

Fig. 1a shows by way of example, an addition control flip-flop ACF controlled in a manner to be later described by the condition flip-flop CNF. A resultant flip-flop RSF is controlled jointly by the reading flip-flop RDF and the addition control flip-flop ACF. The output from RSF passes to two gates STG, OTG which are so controlled in a manner to be later described that the recording can be directed, as required, to the storage head STH or the output or "read-off" circuits or both. If the storage gate STG is open, the output from RSF passes to the storage head STH, again storing the item. However, when it is desired to read off any particular section of the track, the output gate OTG is opened during the time the required item is passing the read head and the outlook from RSF passes to the output circuit, which may be used to record the item somewhere else. From here the treatment depends upon the application. The item, which will be in binary form, may be converted to decimal form and a recording made in a manner analogous to the reconversion and recording process described in the above mentioned patent application Serial No. 198,326, now abandoned.

Alternatively the output could be converted to decimal form and used to transmit decimal trains of pulses to a switching train, or could be used to provide an audible announcement.

The detailed operation of the flip-flops and gates will be described in connection with Figs. 3a and 3b.

In general the control signals on the condition leads CL1 . . . N will not be synchronized to the rotation of the drum, and so a means must be provided to prevent more than one modification being made to a stored item during one application of the control. This is accomplished by using one extra element position per storage section of the track and using this element to provide the information that a modification has been made and no further modification is to be made until the control is removed and a new control appears.

The element marker track ELT supplies the various pulses for the control circuit which controls the flip-flops. The output from the element read head ELH passes to a clock amplifier CLA and a pulse former PUFI to provide $t_2$ pulses in the initial one-third of an element duration. The $t_1$ pulses pass both to a pulse output and to a delay device PUF2, giving a one-third of an element delay and producing $t_2$ pulses which pass both to a $t_2$ pulse-lead and to a second delay device PUF3, which gives another one-third of an element delay and produces $t_3$ pulses. Reading from the drum takes place during time $t_1$ and recording on the drum takes place during time $t_3$.

Fig. 2 shows the pulse and waveform relationship for two storage sections of a drum which storage sections are indicated along the horizontal display labelled "Storage Track." The first element of the first section is labelled EM1, while the remaining item storage elements are labelled E1 to E64. The first element of the second section is labelled EM2 and the remaining elements in that section are labelled E1 to E64.

The item marker track, as previously described, supplies a pulse $t_M$, coincident with the first element EM of each storage section and also an inverted waveform of $t_M$, namely $W_{M1}$, for use in the control circuit. Pulse $t_M$ is also used to step the position counter PC which, therefore, will make one step at the beginning of each storage section.

The output from the read head RDH passes to a balanced amplifier BA and from there to a reading flip-flop RDF. The latter will take up one position for one direction of magnetization of an element and the other position for the reverse magnetization. The reading flip-flop will give, element by element, the existing item on the drum. The condition leads CL1 . . . CLN are examined in turn by connecting them in turn to the condition flip-flop CNF, the particular one being examined being determined by the output of the position counter PC, as applied to one the gates Ga1 . . . GaN controlled by the leads marked $P_1$, PN, and by the condition leads CL1, CLN. The condition flip-flop CNF will be operated accordingly. If the lead under examination shows no signal, the flip-flop will be set to one position (the left), and if a signal is found on the condition lead, the flip-flop will be set to the other position (the right). The output of the condition flip-flop CNF is used to control the addition control flip-flop ACF, as already stated. The latter is so arranged that the first time a control condition for a particular recording is found on the corresponding condition lead CL1 . . . N, it will be set to one position (the right), but thereafter it passes out of control of the condition flip-flop CNF until the condition on the associated lead disappears. This is accomplished by using the output from the reading head RDH produced by the element $E_M$ on the storage track which is used to record whether or not an addition has been made for a received signal on the condition lead. The operation is given in more detail in connection with Figs. 3a and 3b.

The addition control and reading flip-flops ACF, RDF together control the resultant flip-flop RSF. The arangement is such that when no addition or subtraction has to be made, the resultant flip-flop is set according to the output from the reading flip-flop and the previous value is transferred directly from the read head to the storage head. However, when a modification has to be made, the resultant flip-flop RSF will be set according to the outputs of both the reading and addition control flip-flops RDF and ACF. It should be understood that it is possible to subtract a number by adding its complement, so that subtraction becomes simply an addition process.

In Fig. 2 the element positions $E_{M1}$, $E_{M2}$ on the storage track are the elements used to denote in respect of storage sections 1 and 2 that an operation has been carried out for a corresponding control signal on the condition lead. Further, the long pulses P1, P2, indicate the duration of the pulses from successive outputs of position counter PC, each P pulse encompassing the whole of the reading time of a storage section, e. g. $E_{M1}$, $E_1$ . . . $E_{64}$, Fig. 2. $E_{M1}$ is shown to be positive, representing a particular magnetic polarization which indicates that the section of the track associated with $P_1$ has had a modification performed on it and no further modification will be permitted until the magnetic polarization of $E_{M1}$ has been removed. This removal will be effected the first time a scan is made which occurs when the flip-flop CNF is connected in succession to the condition leads CL1 to CLN and is found that the condition signal on the corresponding condition lead CL1 has been removed. On the other hand $E_{M2}$, being zero, representing no magnetization, shows that suitable modification can be made on the second section of the track when the control condition appears on the pertinent condition lead CL2.

A number is stored on a series of elements on the item storage track of the drum with the digit of least significance in the first element.

The means for either re-storing on, or reading off, a particular section of track will now be described. The outputs from the position counter PC, besides being fed to the gates Ga1 . . . GaN, are fed to a gate control circuit GCN. To the same circuit are connected position-required leads P1' . . . PN'. Normally when re-storage is taking place, with respect to a particular position, the position-required lead corresponding to that position will be neutral under control of a circuit, not shown. This will cause the gate control to be set so that the storage gate STG is open and the output gate OTG is closed. When it is desired to read off a section of the track, the position-required lead P1' . . . PN', corresponding to that section, is given a signal from an external source, and when the position counter PC reaches the corresponding position, so that a signal appears on the corresponding P1 . . . PN lead, a waveform is generated by the gate control circuit GCN to open the output gate OTG for the desired time. The storage gate may be left open or it may be closed according to the requirements. The section of the track required will be registered in the output circuit and may be used in any desired manner.

Figs. 3a and 3b are a more detailed circuit diagram of the arrangement of Figs. 1a, 1b, and 1c and illustrates a method by means of which "1" may be added to the previously recorded values, say, for a metering application. Fig. 4 shows the waveforms generated in making this addition. In Figs. 3a and 3b, the flip-flops are shown as gas tubes connected in a well known manner to provide bistable operation. One of the tubes of each pair has a reset lead connected to its cathode circuit over which a negative pulse may be applied from a source, not shown, to insure the flip-flop normally being in the condition with that particular tube operating. A positive pulse applied to the control electrode of one of the tubes of a flip-flop will cause that tube to conduct, if it is not already conducting, and the other to stop conducting. Operating pulses are delivered to the control electrodes over rectifier gating circuits of a well known type and are derived from the marker tracks MKT and ELT of the drum and from the cathodes of the flip-flops. In order to simplify the drawing, connections from the drum marker tracks to the various gate circuits have been indicated by the reference character of the particular pulse involved, although connections from the cathodes of the several flip-flops to the gates have been shown. The reading-off circuit of Fig. 1a has been omitted from Fig. 3a.

In Fig. 4 the portions of the waveforms above the base line indicate when the flip-flop tubes of the corresponding reference characters are conducting and when the pulses from the drum marker tracks are produced. The waveform labelled "Condition Lead CL1" indicates when a signal is present on that lead.

The reading head flip-flop RDF, containing tubes A and B, operates to one condition or the other depending on whether or not a mark or space is being read from the drum. The condition flip-flop CNF, containing tubes C and D, operates one way or the other only at time $t_1$, while the resultant flip-flop RSF containing the tubes G and H, operates one way or the other only at time $t_3$.

The addition control flip-flop ACF containing tubes E and F, operates to cause the tube F to conduct only during time $t_2$, while it operates to cause the tube E to conduct only during time $t_3$. Tube F has a delay network $Fx$ including a resistance, a capacitance and a rectifier in its cathode circuit and is connected so that when the tube F becomes conducting the condenser has to charge first before the output point $Fx$ reaches an effective positive potential. This point $Fx$ provides one of the inputs to the gate which controls the tube E. The delay in the network $Fx$ is such that, although tube F becomes conducting at time $t_2$, the gate controlling the tube E will not open at the next $t_3$ pulse but will have to wait for a subsequent $t_3$ pulse. The purpose of this action will be explained later.

The principle on which the binary addition is based is that when binary "1" is to be added, the digits of the stored number are successively reversed until a "0" digit is reversed, whereafter the digits are not altered for the read-record process. To make sure that this occurs, as soon as an addition of "1" is required, the addition control flip-flop ACF is set with the F tube operating, in which condition it causes all digits to be reversed before the re-recording occurs. Then when the first "0" is reversed and re-recorded as "1," flip-flop ACF is re-set with E operating, whereafter re-recording continues without reversal. This operation of E is obtained by its control electrode gate, the controls of which are potentials from the cathode of tube B, the network $Fx$ and the pulses $t_3$. The potential from tube B indicates that "0" has been read, but the delayed output from the cathode of tube F, provided by the network $Fx$, is to prevent a re-setting of the flip-flop ACF containing tubes E—F occurring while the reading and recording heads are being passed by the $EM_1$ elements.

As has already been stated, there are two sections diametrically opposite each other on the drum assigned to each telephone line represented by the condition leads CL1–CLN, and each of these sections is preceded by an $EM_1$ element. When "0" is recorded in each of the $EM_1$ elements associated with a particular telephone line, it is an indication that "1" is to be added when a potential appears on the associated CL1 lead. When both $EM_1$ elements associated with this line have a "1" recorded therein, it is an indication that "1" has been added and is not to be added again as long as the $EM_1$ elements remain in that condition. When the potential is removed from the condition lead, the condition in the corresponding $EM_1$ elements will be reversed to "0" in a manner to be explained, which will be an indication that the next time a potential appears on the CL1 lead, "1" must again be added. Because of this operation of the $EM_1$ elements we prefer to call them "chalk mark" elements.

Assuming that there is nothing recorded on the track, then all elements including the "chalk mark" elements $EM_1$ will read as "0." Assume now that a meter pulse occurs on lead CL1 for subscriber No. 1. At time $t_1$ of sequence P1, in other words, when the "chalk marks" $EM_1$ in the section of subscriber No. 1 are passing the read head and record head, tube D is operated at time $t_1$ by the opening of its gate $t_1$, $t_M$, P1. The $t_M$ pulse defines the "chalk mark" elements $EM_1$, while the pulse P1 defines the line of subscriber No. 1.

Since the $EM_1$ element or the track is at "0," the reading head flip-flop RDF is set from the reading head with tube B operated. At time $t_2$, therefore, tubes B and D are both operated and tube F in the addition control flip-flop ACF will be operated under the control of the gate D, B, $t_2$. At time $t_3$ the gate $t_3$, B, F sets the resultant flip-flop RSF with tube G operating, which causes a "1" to be recorded in the $EM_1$ element of the drum which is passing the record head at that time. The gate controlling the tube E cannot operate yet, because the output from the $Fx$ network connected to the cathode of tube F is only effective after time $t_3$.

At time $t_1$ of element $E_1$, the first digit place of the sequence assigned to the line of subscriber No. 1, the reading head flip-flop RDF is caused to remain set with tube B operating, since "0" is found on element $E_1$. At this same time the condition flip-flop CNF is re-set with tube C operating because of the opening of the gate $t_1$, D. Since the tube B and the tube F are operating, at time $t_3$, the gate $t_3$, B, F will once again open to cause the operation of tube G and the consequent recording of "1." The $Fx$ network is now effective, and therefore, after the tube G has been operated under control of tube F, the addition flip-flop ACF will be re-set with the tube E operated. On future digits which all read "0," the gate E, B, $W_{M1}$, $t_3$ will open, causing the tube H of the resultant flip-flop to operate and record "0," and thus zeros are read and re-recorded unaltered.

If the meter pulse is still on CL1 when that lead is again scanned by the P pulses, tube D will again operate at time $t_1$ of $EM_1$, but the tube F cannot operate because the "chalk mark" recorded in element $EM_1$ sets the reading head flip-flop RDF with tube A operating. Hence the data is read and re-recorded unchanged.

On the first scan on which no meter pulse appears on the lead CL1, i. e., the first passage of an $EM_1$ element under the read head after the meter pulse has ended, tube D is unoperated. Therefore, at time $t_3$ of element $EM_1$, the gate C, $t_M$, $t_3$ is opened and sets the resultant flip-flop RSF with tube H operating to record a "0." The digit "1," read from element $E_1$, is re-recorded at time $t_3$ by the opening of gate E, A, $W_{M1}$, $t_3$ which sets flip-flop RSF with tube G operating to re-record "1." Subsequent zeros are dealt with by gate E, B, $W_{M1}$, $t_3$ to maintain tube H operating, so as to record zeros. This is the normal read-re-record action.

The binary No. "1" has now been recorded on both diametrically opposite elements $E_1$ assigned to the particular condition lead CL1, and both corresponding $EM_1$ elements have a "0" recorded. If it is now assumed that a second meter pulse is applied to the CL1 lead, at time $t_1$, when the next $EM_1$ element assigned to that particular line passes under the read head, tube D will operate as before. Since this is a new meter pulse and tube B is operated in the reading head flip-flop RDF, at time $t_2$, the gate B, D, $t_2$ opens to operate tube F in the addition control flip-flop ACF. As before, the "chalk mark" is recorded at time $t_3$ by the operation of tube G in the flip-flop RSF under control of gate F, B, $t_3$.

When element $E_1$ passes under the read head, the digit is read as "1" which causes the flip-flop RDF to be set with A operated. Therefore, at the following time $t_3$ the gate controlling tube E in the addition control flip-flop ACF cannot operate because it has to have tube B operated in order for the controlling gate to open. It will be remembered that the delay network $Fx$ in the output of the tube F prevented the operation of tube E during the reading of element $EM_1$. At time $t_3$, since tube F is operated, the gate F, A, $t_3$ opens, setting flip-flop RSF with H operated which causes "0" to be recorded. Thus, the "1" which was recorded on element $E_1$ has now been changed to "0" in the diametrically opposite element $E_1$.

When element $E_2$ which has a "0" recorded on it, passes the read head, flip-flop RDF is set with B operated. At the following time $t_3$, the gate $t_3$ B, F will open, setting the flip-flop RSF with G operated and so recording "1." Since the network $Fx$ is now effective and tube B is operated, the gate B, $Fx$, $t_3$ opens to set flip-flop ACF with E operated. Hence, the first "0" digit previously recorded on the drum has been read, reversed to "1," and re-recorded, after which the addition control flip-flop ACF has been re-set to prevent any further alteration. It should be noted that at the time $t_3$ just referred to, the tube F was initially in operation and thus controlled the setting of tube G in flip-flop RSF and that the tube E does not operate until after this control has been effected.

Subsequent reading produces normal re-recording, as already described. Similarly, the action when the meter pulse ends is similar to that already described, i. e., at element $EM_1$, tube C is operated, so that the gate C, $t_M$, $t_3$ opens to operate tube H and cause "0" to be recorded, even though "1" was read, whereafter each digit is re-recorded as read. Thus at $E_1$, "0" is read to set tube B, so that the gate E, B, $W_{M1}$, $t_3$ causes tube H to operate at time $t_3$ to record "0"; at $E_2$, "1" is read to set tube A in operation, so that the gate E, A, $W_{M1}$, $t_3$ operates tube G at time $t_3$ to record "1," and so on.

After the drum has made a complete rotation, both elements $E_1$ associated with the particular line have "0" recorded therein, while both elements $E_2$ have "1" recorded therein. If the pulse is still being applied to the lead CL1 there will be a "1" recorded in each associated $EM_1$ element. If, however, the CL1 pulse has been removed, "0" will be recorded in each associated $EM_1$ element.

If now a third meter pulse is applied to the CL1 lead, passage of an $EM_1$ element under the read head will cause the operation of tube D in the condition flip-flop CNF which will be followed at time $t_2$ by the operation of tube F in the addition control flip-flop ACF. As before, at $t_3$, the gate F, B, $t_3$ opens because tube B has been operated by the reading of "0" from the $EM_1$ element and tube G of the flip-flop RSF is operated to cause "1" to be recorded. As before, the network $Fx$ does not become effective until after time $t_3$ of element $EM_1$, and hence tube F will remain operated.

When element $E_1$ passes under the read head, tube B will be operated, since reading of $E_1$ is "0." At time $t_1$ tube C re-operates. At time $t_3$ gate B, F, $t_3$ opens to cause the operation of tube G and thus the recording of "1." Also, since the network $Fx$ is now effective, tube E re-operates in the addition control flip-flop ACF. Thus, the "0" previously recorded on $E_1$ has been changed to "1," and the addition control flip-flop has been set to cause re-recording as read.

As element $E_2$ passes under the read head, tube A is operated, since element $E_2$ had a "1" recorded thereon. Then at time $t_3$, gate E, A, $t_3$, $W_{M1}$ causes the operation of tube G which records a "1." When element $E_3$ passes under the read head tube B is operated, since "0" is recorded on element $E_3$, and hence at time $t_3$ gate E, B, $W_{M1}$, $t_3$ opens to cause the operation of tube H in the flip-flop RSF and the recording of "0." Thus, re-recording continues without change.

When the meter pulse ends, the "chalk mark" is removed from both $EM_1$ elements, but subsequent normal reading occurs to maintain the record already recorded.

If it is assumed that five meter pulses have been applied to condition lead CL1, then the binary number 0101 has been recorded in elements $E_4$, $E_3$, $E_2$, and $E_1$ respectively. If it is further assumed that a sixth metering pulse is applied to lead CL1, then when an element $EM_1$ passes under the read head, at time $t_1$, tube D of the condition flip-flop CNF operates by the opening of gate $t_1$, $t_M$, P1 and tube B is operated in the reading head flip-flop RDF because the "chalk mark" in element $EM_1$ was "0." At time $t_2$ the coincidence of the operation of tubes B and D opens gate D, B, $t_2$ in the addition control flip-flop ACF and tube F is operated. Then at time $t_3$ the coincidence of operation of tubes B and F opens gate B, F, $t_3$ in the resultant flip-flop RSF to cause tube G to operate and record a "1" in the $EM_1$ element passing under the record head. Thus the "chalk mark" has been recorded. The gate controlling tube E is ineffective as yet because the network $Fx$ delays the output from tube F.

When element $E_1$ passes under the read head, at time $t_1$ the condition flip-flop CNF is re-set with tube C operated. Also since the element $E_1$ has had a "1" previously recorded thereon, tube A of the reading head flip-flop RDF will be operated. At time $t_3$, the gate F, A, $t_3$ opens to operate tube H which in turn causes "0" to be recorded. Since "1" was read from the track, tube B is not operated, and, therefore, the gate B, $Fx$, $t_3$ controlling tube E is once again inoperative. Therefore, the first digit of the numerical data has been read as "1" and recorded as "0."

When element $E_2$ which has a "0" recorded on it passes under the read head, tube B of the reading head flip-flop RDF is operated. At time $t_3$ the gate F, B, $t_3$ opens to operate tube G. This causes a "1" to be recorded. Since the tube B is operated, and since the network $Fx$ is effective, gate B, $Fx$, $t_3$ opens to operate tube E, thus rendering tube F inoperative. Therefore, the first "0" to be read from the numerical elements of the track has been reversed and recorded as "1," and also the addition control flip-flop ACF has been re-set with tube E operated.

After this, normal reading and re-recording occur. Thus when $E_3$ passes under the read head, "1" is read to set tube A of reading head flip-flop RDF in operation, so that at time $t_3$ gate E, A, $W_{M1}$, $t_3$ opens to operate tube G to re-record a "1." When the following digit elements pass under the read head, "0" is read and tube B operated, so that gate E, B, $W_{M1}$, $t_3$ opens to operate tube H and cause a "0" to be recorded.

On the next scan, if the meter pulse is still present, again tube D is operated via the gate $t_1$, $t_M$, P1, but since the element $EM_1$ is read as "1," because of the "chalk mark" recording made on the previous scan, tube A of the reading head flip-flop RDF is operated. Therefore tube F is uneffected and the normal process of reading and re-recording without change occurs.

When a scan is made and the meter pulse is found absent, tube D is not operated, leaving tube C operated. The element $EM_1$ of the track is read as "1" to operate tube A. Therefore, at time $t_3$, gate $t_3$, $t_M$, C opens to cause tube H to operate, so that "0" is recorded. Thereafter the normal read and re-record action already described occurs.

It will be seen that the original binary number 0101 (5) has now been changed to binary number 0110 (6) by the addition of "1."

When all the elements of the item associated with lead CL1 have been read, the new number, as recorded by the record head, will be "1" greater than the original, and furthermore, the element $EM_1$ has been added. The condition flip-flop now passes under control of the second condition lead CL2 due to the position counter PC passing to the next position, and as the drum rotates, the other CL leads will be scanned in turn. These corresponding items will be transferred as required to the other side of the drum, either changed or unchanged, according to the presence or absence of signals on the corresponding CL leads.

Although the arrangement of Figs. 3a and 3b has been described more in conformity with gas tube circuits, the flip-flops may in fact consist of hard valves or magnetic flip-flops or any such-like devices.

The telephone message registration system shown in Figs. 5a to 5e, 6a, 6b, 6c and 7 is substantially the same as the system described above, the only modifications being in respect of the gating arrangements for transferring or reading off information. Furthermore, recording equipment for read-off information is described.

In Figs. 5a to 5e, 6a, 6b and 6c the flip-flops are shown as rectangle pairs, similar to the way they are represented in Fig. 1a, and the gates are represented as circles. The reading head is connected to the flip-flop RDF by means of a network of gates G1, G2, G3, and G4. The condition flip-flop CNF is connected to the subscribers' lines 1 to 100 by means of gates G5 and G6. These lines correspond to the condition leads CL1 of Fig. 3b. Each subscriber line is connected to the gate G5 over a contact K of a cut-off relay (not shown) and to a line uniselector switch SLS having access to a group selector. The storage flip-flop STF, which corresponds to the resultant flip-flop RSF of Fig. 3b, has input networks of gates G10 to G18 which control it and the outputs are connected to the storage head through a suitable amplifier, not shown.

The reading off is controlled by a guard circuit, shown in Fig. 6a, and a teleprinter control circuit, shown in Figs. 6b and 6c. The guard circuit includes flip-flops F5, F6, and F7 and gates G20 to G28. Normally flip-flop F5 is in the condition of J operated; F6 is in the condition of L operated; and F7 is in the condition of M operated. The teleprinter control circuit includes a counter PCC which is similar to the counter PC having a position for each line, and is stepped by a signal from the teleprinter, indicated at TPC and sent from the teleprinter when a printing has been completed. This circuit also includes flip-flops F8, F9, F10, gates G29 to G32, a stop relay SZ, and a start key STK.

Control pulses $t_M$, $W_{M1}$, $t_1$, $t_2$, and $t_3$ are produced from tracks on the drum, as before, and the P1 to P100 potentials are produced from the corresponding outputs of the counter PC, while S1 to S100 potentials are produced from the corresponding outputs of counter PCC. In addition there is a pulse produced for each storage section, these pulses being labelled in Fig. 7 to correspond to the sections E1 to E14 for each line.

It has been assumed that each subscriber requires 14 binary elements for registering purposes with an additional element to designate that an existing metering signal has already been acted on. Each "memory" is to be capable of containing the information for 100 subscribers. As explained in connection with Figs. 1a and 3, the "memory" may take the form of a track on a magnetic drum, a cathode ray tube storage system, a mercury delay line, or any other suitable storage means. The necessary control pulses and waveforms illustrated in Fig. 7 are obtained by any suitable means, such as those described above.

The description will be given in four sections:

(1) When neither metering nor reading off is taking place, that is, normal transfer.
(2) Metering, but not reading off, is taking place.
(3) Reading off, but not metering, is taking place.
(4) Reading off when metering is taking place.

The conditions for subscriber 1 only will be considered, the operation being the same for all other subscribers although taking place in a different time allocation.

*1. Normal transfer (Figs. 5a to 5e, 6a, 6b, and 6c)*

The counter PC (Fig. 5e) corresponds to the counter PC of Fig. 1a and is synchronized, as previously described, with the flow of the information from the memory, such that when section 1, allocated to subscriber 1, is passing the reading device, PC will have P1 energized and so on for other sections.

When reading off is not required, flip-flop F7, Fig. 6a, has tube F7M conducting and tube F7N normal, so that gates G1 and G2, Fig. 5a, allow information via leads M, S from the memory reading device to pass to the reading flip-flop RDF. If mark element 1 is present RDFA will conduct, and if space element 0 is present RDFB will conduct.

Gates G3, G4, controlling connection from the memory reading device to the guard circuit, Fig. 6a, are closed, since F7N, Fig. 6a, is not discharging. Since no metering is taking place for subscriber 1, there will be no metering signal via the subscriber's line switch SLS (Fig. 5b) and cut-off relay contact K; gate G5 will remain closed even when P1 is energized and tube D of flip-flop CNF will remain conducting. Similarly tube F of ACF will remain conducting. Thus, of the gates associated with storage flip-flop STF, it is possible for gates G10 and G11 or G12, G13 and G14 to open with the requisite condition of reading flip-flop RDF, together with G18 for the duration of the element EM1 but gates G15, G16, G17 cannot open.

Since tube D of CNF is conducting as well as tube M of F7, when EM1 passes the reading device, G13 and G18 are opened for time $t_M$ and at time $t_3$ of $t_M$, G14 will open and cause STFH to conduct, if not already conducting. Thus the storage device will cause a space metering element, EM1, to be stored. As the elements of section 1 pass the reading device, waveform $W_{M1}$ and tube F prepare gates G10 and G12 and these gates will open according to the setting of flip-flop RDF. If A is operated the three conditions for opening gate G10 are coincident. Potential via G10 is now coincident with that from tube M at time $t_3$ to open gate G11 and tube G operates. If B is operated, with F, in time $W_{M1}$, gate G12 opens, and in conjunction with tube M opens gate G13. Potential from G13 at time $t_3$ of $W_{M1}$ opens gate G14 and operates tube H. STF will be set according to RDF such that STFG will conduct for RDFA conducting and H will conduct for B conducting; that is, the information from the reading device will pass without modification to the recording device. As the last element E14 of section 1 passes the reading device at time $t_2$, a pulse is passed via gate G19 and counter PC steps to P2 in readiness for dealing with subscriber 2.

*2. Metering without reading off*

Again tube M of flip-flop F7 will be conducting, thus preparing gates G1 and G2.

When metering takes place a positive potential is applied on the metering wire from the switching circuit and received on the wiper of the subscriber's uniselector SLS. At this time the cut-off contact K will be closed in a manner well understood since the line is in use, so that a positive potential is applied to gate G5. When the section allocated to subscriber 1 is to be read, stage P1 of position counter PC is energized and gate G5 will open. In consequence, at time $t_1$, $t_M$ gate G6 will open and tube C of CNF will be energized. Since no previous addition had been made for this metering signal, tube B of RDF will be conducting, because element EM1 will be registering space. At time $t_2$ of $t_M$ G7 will open, since B and C are both conducting, and tube E of addition control flip-flop ACF will be caused to conduct.

The intention now is to add 1 to the number taken from the reading device and pass the modified reading to the storage device. Also, since this modification is to be made, it is necessary to record 1 on the drum in the element EM1, so that no further additions will be made for the same metering signal. Since both tubes B and E are conducting, gate G16 will be open. Thus at time $t_3$ of $t_M$ G11 will open and tube G of STF will be caused to conduct and a pulse representing a meter marking element EM1 will pass to the storage device. The next time $t_1$, $W_{M1}$, that is, the first $t_1$ pulse in the number storage proper, G8 will open and tube D of CNF will again be caused to conduct.

Now it is necessary to read and modify the digital elements. To add 1 to a binary number, starting at the least significant element it is necessary to reverse all elements up to and including the first zero. As before it will be assumed that before metering takes place the stored number for subscriber 1 is 0101, i. e. 5 and it is necessary to add 1 to make 0110, i. e. 6. Taking the least significant element first, the number 5 is stored as Mark, Space, Mark, Space on the drum by longitudinal magnetization of reverse polarities.

When the first and least significant digit element E1 is read, tube A of RDF will conduct. Since at this time tube E is conducting and $W_{M1}$ is positive, the gates associated with STF which have to be considered are G16, G11, G17, G13 and G14. For the first mark element tube A of RDF is conducting and so G17 will open followed by G13, and at time $t_3$ G14 will open causing H to conduct. Thus, although a "1" or mark was read, a "0" or space is stored. For the second element, B of RDF will be conducting, thus opening G16, and consequently at time $t_3$ G11 will open and cause G to conduct thus recording a "1" or mark. Also at time $t_3$, $W_{M1}$, with B conducting, G9 will open and tube F of ACF will again conduct. Thus for subsequent elements the elements will be recorded under control of G10 and G12 as for normal transfer, that is, the recording will be made as read. Hence elements E3 and E4 will be recorded as received, viz. 1, 0, respectively, and the new recording will be 0110, which is 6, as required, and also a value of 1 for element EM1 will have been added. Assuming that the metering condition is still present, the next time section 1 is to be read, when P1 of counter PC is energized, once again G6 will open at time $t_1$, $t_M$, and tube C will conduct. However EM1 is now mark, so that when the metering element is read, tube A will conduct, so that this time G7 will not open at time $t_2$, an addition control flip-flop ACF will remain with F conducting. At the next time $t_1$, $W_{M1}$, G8 will again open and tube D will conduct once again.

Whilst the metering element is being read, tubes C and F will be conducting, so gate G15 will open, and at time $t_3$, G11 will open and G will be caused to conduct, this restoring a "1" for the other EM1 element. When the digital elements are being read, gates G10 and G12 will open according to the setting of RDF and flip-flop STF will be set in accordance with RDF, as in the case of normal transfer. Although the metering condition may persist for several cycles of counter PC, it can be seen that "1" only is added for one metering signal.

It is assumed that the cycle time of PC is less than either the duration of a metering condition or the minimum interval between metering conditions. After the metering condition has disappeared and P1 is energized once again, G5 will remain closed and tube D will remain conducting. At time $t_M$, G18 will open followed by G13, tube M being permanently energized; at time $t_3$, G14 will open, causing H to conduct and the "mark" metering element, EM1, will be removed and a "space" stored instead. For the digital elements, tube F will be conducting and the elements will be transferred, as received, to the storage head, as already described. A similar procedure takes place for further metering conditions.

3. Reading off with no metering condition present

When it is required to read off the metering registrations, the start key, STK (Fig. 6b) is thrown. Previous to this, flip-flops F5–F10 will be set with F5I, F6L, F7M, F8Q, F9S and F10U conducting and position counter PCC with stage S1, corresponding to subscriber 1 conducting. The position counter PCC is stepped by pulses TPC from a recording teleprinter, which pulses also act as a control on gates G29 and G32. The operation of key STK applies a positive potential via normally closed contacts sz of relay SZ to flip-flop F8, causing tube P to conduct. Tube P conducting opens gate G29 in coincidence with the signal from the teleprinter TPC, and this opens gate G30 which is responsive to a signal control and causes tube R of flip-flop F9 to conduct.

When the reading device is dealing with the last element of section 100, at time P100, E.14, $t_2$, gate G19 opens and the counter PC, Fig. 5e, steps to position P1 in readiness for again dealing with section 1, thus causing G26 to open as soon as counter PCC steps to position S1 when the next pulse TPC arrives. At time $t_3$, E14 with G26 open, and tube R conducting, gate G27 will open and cause F7N to conduct and F7M to be extinguished. This closes G1 and G2, Fig. 5a, preventing the stored information passing to flip-flop RDF, but opens gates G3 and G4 routing the information from the reading head to the guard circuit, Fig. 6a.

For this case it has been assumed that subscriber 1 is not being metered at this time which means that EM1 will not have a mark element. Thus at time $t_1$, $t_M$, G21 will open, causing F5J to conduct. At time $t_2$, $t_M$, G23 will open, causing F6K to conduct. F6K sends a start signal to a binary-decimal converter, to be described hereafter with reference to Figs. 8a to 8g, and at the same time prepares gate G25. This gate will then open and close in accordance with the signals received on the "1" or mark lead from the reading device and will pass the first item to the converter to record the information for section 1.

At $t_2$, E14 for section 1, counter PC, Fig. 5e, steps to P2, thus closing gate G26 and consequently closing gate G27. At $t_3$, E14, G24 opens, causing F6L to conduct and F6K to be extinguished, thus preventing further information passing to the binary-decimal converter; F6L conducting also sends a stop signal to this unit, as indicated by the word "Stop." Also F6L opens G22 causing F7M to conduct, thereby opening G1 and G2, allowing information to pass through RDF, Fig. 5a, until the converter has dealt with the previous information. At the same time, F6L causes F9S to conduct, ensuring that G27 is closed until the next section has to be read off.

Whilst reading off is taking place, at each time $t_3$, G14, Fig. 5d, will be opened due to the fact that F7N is conducting, and consequently the stored information for the particular section will be erased and replaced by the all "0" or space condition.

When conversion of the recording for section 1 has taken place and this result together with the corresponding subscriber's number has been printed, the signal, TPC, is received from the teleprinter control unit. This signal steps counter PCC to the next position S2, and also, in conjunction with F8P conducting, opens G29 together with G30 causing F9R to conduct once again.

Counter PC meanwhile has been counting in synchronism with the "memory" sections and eventually P2 will be energized. P2, S2 will open a gate, not shown, similar to G26 and this, together with R, will open G27 at time $t_3$, E14 of section 1 and F7N will again conduct. The information stored in section 2 will now pass to the converter and the same procedure as described for section 1 will take place.

4. Reading off with a metering condition present

Consider the case when section 1 has been read off and dealt with by the converter and that when it is desired to read off section 2, metering is taking place for this particular subscriber.

As described above, F7N will conduct due to coincidence of P2, S2; close G1, G2; and open G3 and G4, routing information to the guard circuit. Since metering is taking place, at time $t_1$, $t_M$ there will be a mark element present in EM2 and a signal will appear on the "1" or "M" lead. Thus G20 and not G21 will open and F5I will conduct. Since F5J is extinguished, G23 and G25 will remain closed. When F5I conducts, G22 opens and F7 returns to the condition with F7M conducting. This closes G3 and G4 and opens G1 and G2, so that the recording passes to the addition unit and is re-stored without change. Successive trials are made with following coincidences of P2 and S2 until the time when the mark elements in EM2 has been removed, showing that metering has finished, after which the recording can pass to the binary-decimal converter, as described for subscriber 1.

5. Reading off for subscriber 100

Assume that subscriber 100 is allocated the last section of a drum track. When the reading operation has taken place for section 99, F9R will conduct, as previously described. When coincidence occurs between P100 and S100, gate G28 opens, and consequently at time $t_3$, E14 of section 99, G27 will open, thus causing F7N to conduct. If no metering is taking place for subscriber 100, the reading will pass to the converter. When all elements have been passed, G24 opens at time $t_3$, E14, causing F6L to conduct, thus passing a stop signal to the converter and causing F7M and F9S to conduct, as before. In the converter, Figs. 8a to 8g, which will be explained later, section or tube STB of flip-flop F14 is conducting and there will be coincidence in Fig. 6b between the controls STB and S100, thereby opening G31 and causing F8Q to conduct, extinguishing F8P. When the recording has been made for subscriber 100, the signal TPC returned from the teleprinter control steps PCC back to its original poistion with S1 conducting, but since F8P is no longer conducting, G29 does not open and F9 remains with F9S conducting. Instead, G32 opens, causing F10T to conduct, thus operating the stop relay SZ. SZ removes the positive potential from F8, so that no further reading operations can take place without further operation of STK. When STK is released, a positive potential is applied to F10U causing F10U to conduct and F10T to be extinguished. This releases relay SZ and the control circuit, Fig. 6b, is now back to normal and in readiness when further readings have to be taken.

The binary-decimal converter described in U. S. application Serial No. 197,206, filed November 24, 1950, now abandoned, could be used, but the reading off speed used in the present device, is somewhat slower than was envisaged in the said application, and so it is possible to use the simpler arrangement to be described with reference to Figs. 8a to 8g.

One flip-flop is provided for each element of a section. In the case under consideration, there would be fourteen of these flip-flops, but four only, F15–F18, have been shown in Fig. 8b. Initially these flip-flops are set, in a manner to be later described, so that F15S1, F16S2, F17S4 and F18S8 are conducting. Three other flip-flops, F12, F13, and F14 are provided. These are set in a manner to be later described with F12SZ, F13SZA and F14SZB conducting. Four counters PCU, PCT, PCH and PCTH are provided, all of which are normally in the "0" positions. The flip-flop F13 is controlled by flip-flop F12 and by a gate G54; flip-flop F14 is controlled by flip-flop F13 and by a gate G41; flip-flop F15 is controlled by gates G33, G34, G42 and G43; flip-flop F16 is controlled by gates G35, G36, G44, and G45; flip-flop F17 is controlled by gates G37, G38, G46, and G47; flip-flop F18 is controlled by gates G39, G40, G48, and G49. Counters PCU, PCT, PCH, PCTH are respectively controlled by gates G50 to G53.

A local converter pulse generator is also provided, as shown in the upper right corner of Fig. 8a. This pulse generator has a frequency which is independent of the frequency of any other pulses used in the various circuits but is compatible with the practical operation speeds of flip-flops F15 to F18 and the counters PCU, PCT, PCH, and PCTH. The generator produces a pulse indicated by CVP.

When it is desired to read off a number, F6K in the guard circuit, Fig. 6a, is caused to conduct, as described previously. This applies potential to the start lead and causes F12ST, Fig. 8a, to conduct, the latter like-wise causing F13STA to conduct. G41 remains closed under these conditions.

Only "1" or mark digits of a number are sent from the guard circuit to the converter via lead CML. The gates G33, 34; G35, 36; G37, 38; G39, 40; associated with the successive flip-flops F15, F16 . . . , are controlled respectively by successive time pulses E1, E2 . . . , Fig. 7, so that mark pulses on lead CML from Fig. 6a are routed to the correct flip-flop even if signals are absent in certain of the time positions. If the first digit is a "1," G33 will open, causing F15M1 to conduct, but if the element is a "0" there wi'l be no signal on CML, G33 will remain closed, and F15S1 will be left conducting. For the second, third and fourth digits read off, gates G35, G37 and G39 will open or remain closed, according as mark signals are or are not received in time positions E2, E3 and E4. Likewise for the remaining digits, stored in the section being read the associated gates will be opened when required and in turn, until all the binary digits have been read off. The flip-flops will then have been set up to denote the binary number which was stored in the section.

When the last digit has been read off, F6L, Fig. 6a, will conduct as previously described, and apply potential to the Stop lead, thus causing F12SZ to conduct or remain conducting and this tube, with F13STA still conducting opens gate G41, causing F14STB to conduct. This starts the local converter pulse generator, which then produces pulses over the wire CVP.

To illustrate the conversion, take the case when the reversed binary number is 0101, i. e. 5. After reading off, flip-flops F15–F18 will be set up with F15M1, F16S2, F17M4 and F18S8 conducting. The first CVP pulse received from the converter pulse generator wi l open G42 causing F15S1 to conduct. Also one pulse will pass via G50 causing PCU to move from U0 to U1. The condition of the flip-flops is now F15S1, F16S2, F17M4, F18S8, representing the binary number 0100, i. e. 4. Thus, while 1 has been added to the count in PCU, 1 has been subtracted from the number set up on the flip-flops. The next CVP pulse will open G43 and in turn G45 and G46 and will operate F17S4. The same CVP pulse steps PCU to U2. The opening of gates G43, G45 also causes the opening of gates G34, G36 and sections M1, M2 of F15, F16 are made conducting in place of S1, S2, so that the condition of the flip-flops is now F15M1, F16M2, F17S4, F18S8, representing the binary number 0011, i. e. 3. Thus, once again 1 has been added to the count in PCU and 1 has been subtracted from the number set up on the flip-flops. The third CVP pulse opens G42 only and the state will change to F15S1, F16M2, F17S4 and F18S8, representing the binary number 0010, i. e. 2; PCU also steps to U3. The fourth CVP pulse is received, G43 and G44 open and the positions are changed to F15M1, F16S2, F17S4 and F18S8 representing the number 0001, and PCU steps to U4. The fifth pulse opens G42 only and all flip-flops will thereafter be in the S position, representing the number 0000, and the counter PCU will have moved to U5. When F15–F18 are all back to their initial condition G54 will open, causing F13SZA to conduct which in its turn causes F14SZB to conduct, thus stopping the pulse generator and preventing further CVP pulses passing to the converter from the pulse generator. It will be noted that the counter PCU is now recording the decimal number equivalent to the binary number which was read off. Furthermore, at this time the counter PCC in the control circuit, Fig. 6c, will still be at the position denoting the number of the subscriber to which the record which has been read off and converted corresponds. Thus, the necessary information is available to make a teleprinter (or any other suitable) record. When F14SZB conducts again, gate G55, prepared as required, will open and send a signal to the teleprinter control circuit causing the record to be made. When the record has been made, the teleprinter control circuit sends a signal, TPC, to the control circuit, Fig. 6c, and the operation will proceed, as described above with the record of another subscriber. The teleprinter control circuit can also cause the counters PCU, PCT, PCH, PCTH to return to the home position.

In the above it was assumed that the number recorded was the binary equivalent of the single digit decimal number 5. However, with the four ten-position counters shown PCU, PCT, PCH and PCTH, it is possible to record any decimal number up to 9999 since the counters are interconnected in such a manner, that, in response to the 10th, 20th, etc. CVP pulses, PCU, gate G51 will open and cause PCT to step, whilst in response to the 100th, 200th, etc. pulses, gate G52 will open and cause PCH to step, and in response to the 1000th, 2000th, etc. pulses, gate G53 will open and cause PCTH to step.

As described, the reading off arrangement starts at subscriber 1 and continues through the sequence to subscriber 100. By a simple arrangement it would be possible to read any desired subscriber's recording without the necessity of reading through the others. This would be accomplished by presetting PCC to the desired subscriber's position, say, by a simple key arrangement; then by operating the start key STK, the necessary information could be read off. The operation could be stopped by releasing the STK key, or otherwise the control circuit could be restored to normal by a simple switching device after taking the required reading.

In the above arrangement, when reading off, information passed to the converter unit is wiped out on the original store. Again it requires only a simple modification to allow reading off to take place without wiping out the original record. This could be accomplished by omitting the control N on gate G14, Fig. 5d.

A further modification would be to have the switching gates on the output of STF, instead of the inputs of RDF, in which case the guard circuit could be eliminated, for there would no longer be the necessity to prevent reading off whilst metering was taking place, but this would involve other modifications to the gating circuits to prevent the elimination of the EM element during this period. The arrangement used saves this necessity and leads to simpler gating arrangements.

As described, the reading-off device has been made common to one "memory" unit only and thereby capable of dealing with 100 subscribers only. By the use, for instance, of uniselectors arranged in normal telephone type circuits, it is possible to make the reading unit common to a number of "memory" units, in fact, one only would be necessary for a complete exchange installation.

Figure 10:
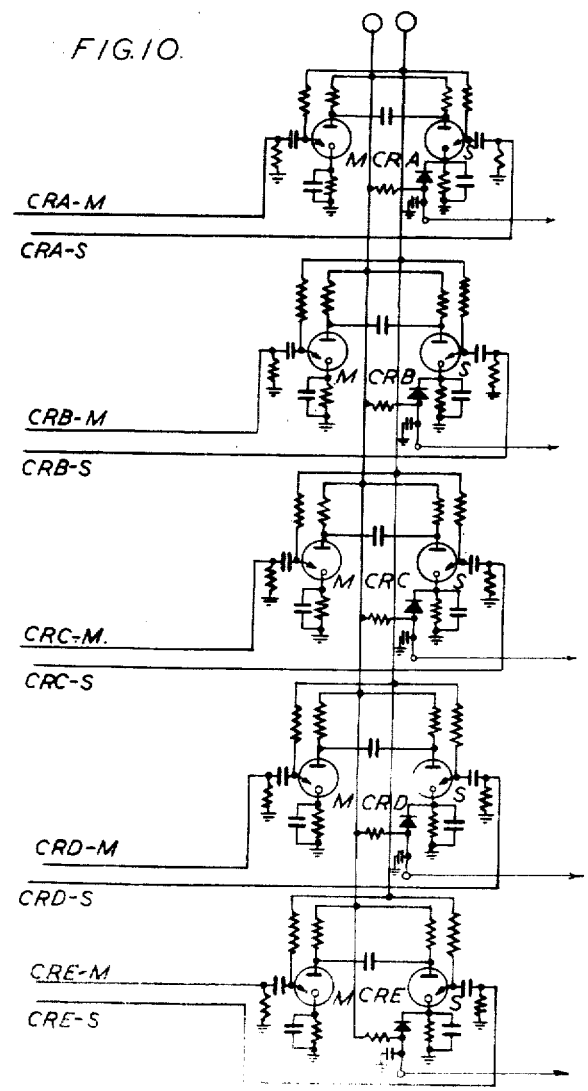

Figs. 9 and 10 together represent means for transforming each decimal digit into a five-unit teleprinter code.

The coder is a rectifier network, shown particularly in Fig. 9, used to translate a numerical result, as recorded in the decimal portion of the binary-to-decimal converter, to the particular code used for recording on the tape of a magnetic storage unit. The register, Fig. 10, is used to store this numerical result when it is so coded.

Coders and registers are provided on a basis of one for each digit or character which has to be passed from the converter to the teleprinter.

The code assumed in Fig. 9 is the International Telegraph Alphabet No. 2 which is as follows:

| Character | Code |
| --- | --- |
| 1 | MMMSM |
| 2 | MMSSM |
| 3 | MSSSS |
| 4 | SMSMS |
| 5 | SSSSM |
| 6 | MSMSM |
| 7 | MMMSS |
| 8 | MMMSS |
| 9 | SSSMM |
| 0 | SMMSM |

Figs. 9 and 10 show a circuit dealing with one digit of a result, five flip-flop tube pairs CRA . . . CRE being used for registering the five variable elements as M or S. It should be emphasized here that similar circuits are provided for every digit in a result, transfer of all digits from the binary-to-decimal converter to the coder and register being simultaneous. Fig. 9 shows a rectifier network having ten input terminals representing digits 1 to 9 and 0. A transfer control lead, shown at the bottom of Fig. 9, is used to start the registering operation by the application thereto of a positive potential from a source, not shown. Pulses at a repetition rate of 5KC/S are also supplied to the terminal at the lower left hand corner of Fig. 9 from a source, not shown, in order to operate the circuit. Each of the input leads 1 to 0 on the left-hand side of Fig. 9 is connected to the appropriate cathode of the corresponding decimal denominational tube of the binary-to-decimal converter, Figs. 8a to 8g.

Consider that the particular digit recorded by the counter PCU, Fig. 8a, is 1. A positive potential is then applied to terminal 1, via the first of the ten leads which extend from the ten sections U0–U9 of PCU, Fig. 8c, to the ten terminals 0–9 Fig. 9, so as to bias rectifier W318 positive, but rectifiers W319–327 remain connected to earth through the PCU sections. When the conversion is to occur, the transfer control lead acquires a positive potential thus giving rectifier W328 a positive bias. The next 5 kc./sec. positive pulse applies a positive pulse to rectifier W329, and this in conjunction with the positive bias on W328 causes a positive pulse to be applied to rectifiers W330–9. Since W318 is the only rectifier in the leads to the aggregator which has a positive bias, a positive pulse is applied to the decoupling rectifiers W340–4, but no pulse is applied to any of the rectifiers W345–389. It will be seen that W340–4 are connected respectively to the triggers of tubes CRA–M, CRB–M, CRC–M, CRD–S and CRE–M. In consequence, these tubes strike, extinguishing the other tubes in the flip-flop pairs if any of these tubes had been previously conducting. The tubes struck denote MMMSM which is the telegraph code denoting the digit 1. The setting of the flip flops is accomplished in a similar way for digits 2–9 and 0, the connections being such as to produce the codes shown in the above table.

The teleprinter code transmitter is the unit used to supply potentials in accordance with the information it is desired to record on a teleprinter. It is controlled by the registers, Fig. 10, and a time scale generator to cause telegraph signals to be passed to a teleprinter. The registers themselves provide the characters which are to be recorded, the time scale generator produces the unit-periods for the code signals and other time intervals necessary, and the composition distributor passes the characters forward in their correct sequence.

Each character consists of a start element, five code elements and two stop elements, and the transmitter is designed as a cascade arrangement. This obviates the necessity of having too large a number of controlling sources for any one tube. For example, if there is a possibility of having 12 characters in a result to be printed, the number of variable code elements would be 5×12=60, involving 60 controlling sources for a flip-flop tube pair used for the transmitter. By suitably dividing these sources it is possible to arrange that there would be, say, four flip-flop tube pairs each controlled from 15 sources, and these pairs could be examined consecutively to control a further stage. To further reduce the controlling networks, it is arranged that the elements are examined for a "space" condition only and an automatic return of the flip-flop pairs to the "mark" condition is used.

Fig. 11a shows the controlling rectifier network used for the flip-flop pair TR1–M/TR1–S associated with the first three characters of a result. There are other tube pairs TR2–M/TR2–S, TR3–M/TR3–S . . . (not shown) and suitable networks for other groups of three characters. As the start and stop elements are invariable these are inserted at the final stage of the transmitter, Fig. 12.

The circuits of Figs. 11a and 12 are controlled by pulses from the time scale generator circuit TSG, shown in Fig. 11b. The basic pulse frequency is 5 kc./s. The pulses supplied to lead L are 5 millisecond pulses at 50 cycles per second. Pulses supplied to lead P are also of 5 milliseconds duration but occur at 6.25 cycles per second. The other pulses have a duration of 20 milliseconds and a repetition rate of 6.25 cycles, but occur at successive time positions. These pulses are represented in Fig. 12a.

Initially the reset potential from a source not shown fires TR1–M. The control circuits for TR1–S consist of fifteen coincidence gates, one per permutable element of the three characters served by TR1–M, TR1–S. Only five of these are shown. Each is controlled from one of the space tubes of the register for the digit concerned and by a pulse from another control connection, these other connections going to points marked A to E. These points are sequentially energized from time scale pulse generator TSG at the speed at which the teleprinter operates, e. g. 50 bauds, so that the gates are each allowed to influence the tube TR1–S in turn. The group of five gates for the register and character in question is fed by 5 kc. pulses but a pulse can only get to the set of five gates it its connection marked X is also energized. The connections X go to a distributor which energizes these connections in turn, so that only one character at a time can be effective.

Assume that X is biased positive for the character to be transmitted. Then each time one of the leads A to E is biased positive by a time scale generator circuit, this occurring for a short period once in each time scale cycle, a 5 kc. per second pulse is gated through to TR1–S if the permutable element circuit is a space.

Just before each of leads A to E is energized by the time scale generator, the time scale generator energizes lead K, which refires TR1–M, if TR1–S was fired. Then if the next code element is a mark, TR1–S give no output. Hence for each space element of its characters, TR1–S delivers a cathode output from the gate connected to its cathode to the portion of the circuit, upper right, Fig. 12, which inserts start and stop elements.

Connections are taken from the cathodes of the space tubes, TR1–S, TR2–S, TR3–S etc., to a rectifier network used to control the flip-flop tube pair, TM—TS (Fig. 12). Also in this stage is the connection by means of which the space element indicating the start unit period is inserted.

When TR1–M, TR2–M, etc., are initially struck, tubes TM, TXM also are fired by potentials applied to their cathodes over the respective reset leads. Before the first code element is examined by TR1–M/TR1–S the rectifiers W527 (Fig. 12) is biased positively by the pulse applied to the L lead from the time scale generator TSG part way through each element. For the start element, the time scale generator TSG puts a positive bias on lead Q at the same time that W527 is biased positive. A 5 kc./sec. positive pulse is then applied via rectifier W537 to the trigger electrode of tube TS. At this time the connections from TR1–S, TR2–S etc., are at earth potential, as the respective flip-flop pairs are all in the mark condition. Tube TS strikes, extinguishing TM, thus giving a positive bias to rectifier W544; W543 is connected to earth. The same positive 5 kc./sec. pulse steps the time scale generator to produce a potential on lead P, so that rectifiers W546 and W548 are given a positive bias. The next 5 kc. pulse, which steps the time scale on from the position in which it biases lead P, also gives a positive bias to rectifiers W545 and 547 for the duration of the pulse and, because of the potential already applied to W544, TXS strikes, extinguishing TXM. The output potentials taken from the cathodes of tubes TXM and TXS are used to control the teleprinter (see below).

The tube pair TM/TS is restored to its normal condition with TM conducting by means of the biases applied to rectifiers W542 and 541 but tube TXS remains conducting. The bias on lead L is supplied by the time scale generator TSG at the beginning of each code element. The next time that the time scale generator steps to provide a potential to W527, the time scale has stepped to the position for the next element, so that the connection to TS via rectifier W537 loses control. However, the time scale puts a positive potential on lead A, and a connection from TR1–S via rectifier W533 becomes positive if the first code element of the first character is a space and it remains at the positive potential for the time the time scale generator is biasing leads P and Q. Connections from TR2S, TR3S . . . (not shown) are still connected to earth. It was assumed that the first code element was a space, so that when rectifier W527 became blocked, W533 was also positively biased and W534 was biased positive by A, so tube TS is therefore struck by a triggering pulse applied via rectifier W539. The conditions (biased positive or not) of W544 and 545 are again examined before the tube pair TM/TS is restored, and since rectifier W544 has a positive bias due to TS conducting, tube TXS remains struck. Had the first variable element been a mark, W543 and not W544 would have had a positive bias, so that TXM would then have been struck, extinguishing TXS, and causing a mark indication to be emitted.

TM is again restruck when the time scale generator TSG gives a potential on lead L (see above). In like manner the other code elements denoted by the presence or absence of positive potentials on the connection from TR1–S are examined. For each element there is a gate like those shown, each such gate having a control lead to TR1–S and a control lead to the time scale generator TSG. It should be noted that TXM/TXS is not automatically restored, as is the case with the other flip-flop pairs, but changes over only when there is a change of polarity detected in the examined elements. After the code elements of the first character have been examined, TM restores to its conducting state and this flip-flop pair remains in this state until the time scale generator TSG returns to the condition in which potentials are produced on leads Q and the lead bias to apply to W527, enabling another start element to be inserted before the next character to be recorded. The time interval between the end of the fifth code element and the next start element is equal to two unit-periods and provides the two recorded mark elements used for the stop portion of the character combination. That is, the mark elements are produced by the fact that there is no space element.

The potentials on TR2S, TR3S . . . (not shown) are examined in similar manner and the signals denoting the code elements of the different characters are passed in correct sequence to the recording medium.

The output leads from TXM—TXS are marked M and S respectively. These pass to a telegraph device of well known type to produce a teleprinter signal on a single wire for use by the teleprinter.

The invention has so far been described in terms of a magnetic drum as the means of storing information. An extrenal circuit was used to read information from the drum and to return the information in either its original or modified form. It is possible to use means other than the drum to store the information, still using a similar form of external circuit. Two such systems are outlined below, one using a mercury delay line and the other a cathode ray tube of a particular type as the storage means.

Mercury delay line storage is shown in Fig. 13, the reading, condition, addition control, and record flip-flops are as described above. The pulse supplies previously obtained from tracks on the magnetic drum now have to be provided, for instance, by using an oscillator and pulse shaper to provide basic clock pulses and using well known methods to derive the other required pulses from the clock pulses. Mercury delay line storage has become known in connection with electronic computers, and an example is shown and described in the British Journal, Electronic Engineering, for July 1948, in an article "An ultrasonic memory unit for the EDSAC," on pages 208–213, by Wilkes and Renwick. The present schematic circuits are based on Fig. 3 of the said article.

Consider that a series of numbers to be recorded, and modified, if necessary, are circulating in binary form through the mercury delay line and external circuits. Further, assume that the first element in the series is present and has just arrived at the right hand end of the delay line. The pulse, which is ultrasonic, is amplified by the ultrasonic amplifier, ULA, assumed to be 13.5 mc./sec. and is then rectified in RCT to remove the ultrasonic carrier, leaving the video pulse. This pulse passes to the video pulse amplifier and pulse shaper VAS. This circuit is arranged to give two outputs, one of which, say M, will be a positive pulse and the other, say S, earth when an element is present and vice versa when an element is absent. In the case considered, i. e. an element present, the M lead will have a positive pulse and the S lead will be at earth. The two outputs pass to two gates where they are gated by clock pulses to restore their shape which will have become distorted by passage through the mercury delay line. The gate outputs are used to set the reading flip-flop, which, for the example considered, will be set to the mark side. The remaining flip-flops operate as described above. The record flip-flop output is used to modulate the 13.5 mc./sec. oscillator and the element passes back as required into the mercury delay line.

Since the circuit used for modifying the stored information produces delay, the length of the mercury delay line is such that the sum of the delays in the mercury and in the external circuit is equal to the required circulation time for the number of elements which it is desired to store.

Cathode ray tube storage is illustrated in Fig. 14, and is based on the dot-dash display described in "A storage system for use with binary-digital computing machines," by Williams and Kilburn, published in the Journal of the I. E. E., part III, March 1949. The tube is the so-called "Williams" tube which has also been used in electronic computers in the U. S. A. A signal or pick-up plate PU consisting of a sheet of metal foil or gauze, external to the end of the cathode ray tube, is closely attached to the face of the tube. Each area of the screen is therefore capacitance coupled into a common channel, as in the ionoscope. The digits are represented by charge distributions which exist in small areas in two-dimensional array on the screen.

The areas are subjected sequentially, line by line, to electron bombardment, and video signals are obtained from the pick-up plate PU. Again the reading, condition, addition control and record flip-flops are as described above. The strobe pulses and dot and dash waveforms are obtained as described in the above mentioned article. The other required pulses are derived by well-known methods from the strobe pulses. The X time-base circuit for the cathode ray tube is similar to that described for the dot-dash system but the Y time-base circuit is similar to a television type time-base in which the beam is caused to move progressively down the face of the tube.

It is assumed that a series of numbers has been recorded on the cathode ray tube and that the first element, a dash, is just being scanned by the beam. The positive output is amplified and passes to a gate STG1 where it is gated by the strobe pulse, giving a positive output from the gate. If the element had been a dot the output from the amplifier would have been negative in which case there would be no output from the gate. The output from the gate passes to an inverter IVR and also in parallel to a dash cathode follower DSF. The inverter output passes to another gate STG2 where it is gated by a strobe pulse and the gate output passes to a dot cathode follower DTF. This arrangement is used so that when a dash element is scanned by the beam, the dash cathode follower DSF gives a positive output and the dot cathode follower DTF no output and vice versa if the element scanned by the beam is a dot. By this method the reading flip-flop is set in accordance with the element being scanned. The remaining flip-flops operate as described above. The two outputs are taken to gates where one, DSG, is gated with a dash waveform and, the other, DTG, with a dot waveform. In the case when it is desired to re-store a dash, there will be a dash waveform from the dash gate and no output from the other gate, and when it is desired to re-store a dot, there will be a dot waveform from the dot gate and no output from the other gate. The outputs from the gate, which will be negative going, are inverted in IVS and passed via a cathode follower CTF to the grid of the cathode ray tube CRT to modulate the beam of that tube.

The time for which the beam remains on a position on the face of the tube is fixed to take care of the delay in the external circuits.

The remaining drawings show another form of equipment for registering on magnetic drums the number of calls made by telephone subscribers and also a method of extracting the information, thus stored, and converting it into a suitable form for permanent recording, for instance, by printing.

The equipment can register unit fee calls or multi-fee calls when it is not required to give a separate record of the number of calls of different fees. After a suitable period of time, the number of calls recorded can be read off and printed, together with the appropriate subscriber's number, on a printer. The operation of the system will be described up to the point where both the subscriber's number and the number of calls made by this subscriber are in a form suitable for application to any desired form of recording device.

The magnetic drum, Fig. 15, is similar to the drum already described and consists of a nickel-plated brass cylinder of sufficient length to provide a number of non-interfering parallel magnetic registering tracks TR1 ... 10 round its periphery. Each track has a read head RDH and a store head STH, the two heads being connected by means of electronic circuits. Each track can be divided into a number of elements, each of a length adequate for recording a longitudinal N–S or S–N magnetic record. For the purpose of this description it will be assumed that one drum is allotted to 1000 subscribers and that the drum consists of 10 tracks, each track, therefore, being common to 100 subscribers. As two separate heads are used per track, it is necessary to utilize two sections of the track per subscriber, i. e. each track is divided into 200 sections, each section consisting of sufficient elements to store the maximum number of subscriber calls on a binary basis. If it is assumed that 14 elements are used per section, the maximum number of calls that can be registered in binary notation will be approximately 16,000. As will be seen later, two additional elements are required per section, making 16 in all. Round the periphery of each track it will be necessary to have 200×16=3,200 elements. It is possible to register 100 elements per inch, this means a drum about 32 inches in circumference having a diameter about 10 inches.

The rotational speed of the drum must be such that the time taken for half a revolution is less than the minimum time of the metering pulse, say 100 microseconds. Therefore, the minimum speed of the drum would be 300 R. P. M.

In order to produce pulses which are locked to the rotation of the drum, an additional track TRP is provided which has teeth cut on its periphery. There is one tooth per element: i. e. 3,200 teeth. After cutting, these teeth are magnetized. As the drum rotates, these magnetized teeth produce pulses in an associated pulse head PH. A synchronizing track TRS is also provided which has one magnetized tooth, similar in size to a pulse tooth, and a synchronizing head SH.

If necessary, more tracks can be added to the drum to increase its capacity.

The electronic equipment for a drum comprises a number of sets of circuits, each individual to one drum track, and a set of circuits common to the drum. Referring to Fig. 15, the equipment per track consists of an amplifier AMP1 . . . 10, connected respectively to each read head RDH1 . . . RDH10, a track control circuit TCC connected to the amplifier, a mixing circuit MXC, and an adition circuit ADC. For metering purposes the drum is continuously rotating and the heads are continuously reading and re-storing. At any moment the heads of a track are reading one section allocated to a particular subscriber and registering on his other section. Assuming no addition is taking place, as the drum rotates, pulses corresponding to the stored information are produced in the read head and passed via the track control circuit TCC and addition circuit ADC to the storage amplifier and head STH1 . . . 10. Therefore a magnetic pattern is impressed on the section of track passing under the storage head. This pattern consists of longitudinal N–S or S–N magnets head-to-tail without any gaps and therefore is overprinted on the existing pattern on the section without the necessity of first erasing the previously existing pattern. This pattern is the same as that passing under the read head. In this way, the information is passed from one section of the drum to a section which is, for example, diametrically opposite to the first.

When a metering pulse is received on one of the P wires leading to the mixing circuit MXC, a condition is applied in the manner to be later explained by the mixing circuit MXC to the addition circuit ADC at the instant that the section of track corresponding to the line being metered passes the read head RDH1 . . . 10. The addition circuit causes "1" to be added to the binary number being transferred from the read to the record head in a manner to be later explained, that is to say, the number of calls registered has been increased by "1".

The output from the pulse head PH is fed over amplifier AMPP into the drum pulse circuit DPC. This circuit corresponds to the clock amplifier CLA and the pulse former PUF1 and delay circuits PUF2 and PUF of Fig. 1c. It is common to the drum and produces the various pulses PU required for the associated circuits. These pulses are shown in Fig. 16. Pulses T1 are produced directly from the pulse head, as are the pulses $t_1$ of Fig. 1c, whilst pulses T2 and T3 are derived by means of delay circuits from T1 in a manner similar to that described in connection with Fig. 1c. The other pulses are produced from T1 by means of counting chains and flip-flops which count from the coincidence of a T1 pulse and the synchronizing pulse delivered once each rotation of the drum from the synchronizing head SH.

A more detailed description of the system follows.

Fig. 16 shows portions of two sections of the track with their associated pulse supplies. Each section, corresponding to one subscriber's line, consists of 16 elements. Each digital element represents a power of 2, e. g., $E1=2^0$; $E2=2^1$; $E3=2^2$; $E4=2^3$ etc. Two elements ES and EM are also included at the beginning of each section; their function will be described later. T1 appears at the beginning of each element, followed by T2 and T3. T$m$ is applied for the duration of each element EM. W$m$ is the inverse of T$m$. P1 is on for the duration of section 1, while P2 is on for the duration of section 2. Therefore, there is a discrete pulse as each section passes a head. There is also a discrete pulse for each element E1–E14. All pulses are derived from the T1 pulses.

The pulse circuit is common to the drum and supplies the pulses required to operate all of the circuits associated with the drum.

Pulse SY is obtained from the synchronizing track TRS, Fig. 15, via the synchronizing head SH. Coincidence between SY and a T1 pulse indicates the start of section 1 and thus ensures that after a stoppage, the position of each section of the drum is the same as previously. This pulse can also be used for synchronizing on each revolution of the drum.

The mixing circuit, Fig. 17, connects the 100 P wires of the subscribers' line circuits to the addition circuit ADC.

When a metering signal appears on any line in the group, it is passed on to the addition circuit ADC (Fig. 19) when the section of track corresponding to this line is passing under the read head. This is controlled by the appropriate pulses P1–P100. Assuming that No. 2 line has a metering signal on its P wire; when pulse P2 appears and the corresponding element EM begins to pass under the read head, coincidence occurs between L2, P2, T$m$, T1 and TR, and a pulse is applied to the addition circuit via the ST lead for the duration of T1. The potential on TR comes from the cathode of tube RB in Fig. 18. There is a positive potential on TR except when information is being read off for printing purposes, as described below.

This mixing circuit ensures that an addition signal is only given to the addition circuit when the required section and element of track is passing under the read head. One mixing circuit is provided per track.

One track control circuit TCC is connected to each track. This circuit is shown in detail in Fig. 18, and its function is to switch the output from the read head amplifier, e. g. AMP1, to either the addition circuit ADC or the guard circuit GDC. When the normal transfer from read to store heads is taking place, tubes RA and RB are fired in a manner to be described. With tube RA operated, a positive potential is delivered to the control electrodes of tubes RS and RM which operates these tubes. The tubes RS and RM act as gates which pass the signals from the read head amplifier, indicated at the bottom of Fig. 18, to the addition circuit of Fig. 19. The operation of tube RB applies a potential to the TR lead to the mixing circuit, thus ensuring that the mixing circuit will only pass a metering pulse to the addition circuit when the track control circuit is in the condition allowing transfer from read to store heads.

The operation of the track control circuit when information is being extracted from the drum will be described later.

The addition circuit ADC, one per track, shown in detail in Figs. 19 and 20, is essentially the same as that described above in connection with Figs. 3a, 3b, and 3c, except that two additional tubes EA and FA are used. These will be described later. The method of transfer without addition will be described first. Fig. 21, left hand side, is a chart showing the operation of the circuit under this condition. For this purpose only four digit elements are shown. The number stored is assumed to be 5, i. e., in binary form 0101 and the section of the track is No. 2.

A mark condition indicates digit "1," whilst a space condition indicates digit "0." ES2, the first element of a section always gives a space. As ES2 passes the read head, the condition of the flip-flops (of Figs. 19 and 20) is B, C, E, EA and H fired. Tube EA is fired because of the positive potential applied to its input circuit from the cathode of tube E. EM2 is normally in the space condition unless an addition has been carried out and the corresponding metering signal is still on the P wire. Therefore, in this example, EM2 is in the space condition. As EM2 passes the read head, tube B remains fired. Pulse P2 comes on at the start of ES2 but is ineffective in the mixing circuit to operate tube D, as there is no metering condition. T2 has no effect on the circuit. T3 in conjunction with W$m$, B and EA opens gate GA6 by blocking the associated rectifiers and applies a pulse to the grid of H which is already fired. Similarly, no change in the circuit takes place when element EM2 is under the read head, due to coincidence between C, T$m$ and T3 in gate GA5, whereby the tube H is maintained in operation.

E1 is in the mark condition; therefore A fires and B is extinguished. T1 and T2 are ineffective, but due to coincidence between T3, W$m$, A and E, GA2 opens, and tube G fires and extinguishes H. G being fired causes a mark condition to be applied to the store head. E2 is in the space condition; therefore B fires and extinguishes A. T1 and T2 again have no effect, but with coincidence between T3, W*m*, B and EA in GA6, tube H is fired and G extinguished and a space applied to the store head. The circuit functions in the same way when elements E3 and E4 pass under the read head, i. e. a mark and a space are applied in turn to the store head. In this way the number stored on one section of the track is transferred to, and overprinted on, the second section of the track corresponding to the same line. At the end of the last element of a section, the appropriate P pulse is removed and the P pulse corresponding to the next section of track is applied to the mixing circuit.

It will be observed that when normal transfer is taking place, tube A controls tube G and tube B controls tube H. It will also be noticed that there is a delay between the operation of the AB flip-flop and the operation of the GH flip-flop. This delay necessitates the displacement of the store head by a distance equivalent to ⅔ of an element.

The method of adding 1 to the number already stored will now be described. The right hand part of Fig. 21 is a chart showing the operation of the circuit in this condition. As in the case described above, P2 is applied to the mixing circuit as ES2 passes the read head, and also, as before, tubes B, C, E, EA and H are fired. It will be assumed that the number already stored is 5 i. e. a "mark" condition on elements E1 and E3.

A metering condition is applied to the P wire of line No. 2, i. e. L2 in the mixing circuit (Fig. 17). As EM2 passes the read head, coincidence will occur between L2, P2, T1, T*m* and TR, Fig. 17, to apply a pulse to the lead ST to Fig. 20 in which tube D fires. D extinguishes C. Since EM2 registers Space on the track, B will be fired. Coincidence occurs between T2, B and D in gate GA9 to fire F which extinguishes E. Coincidence between F and T3 opens GA10 and fires FA which extinguishes EA. Due to the CR cathode load of FA, the cathode potention builds up slowly, thus preventing E from firing during this T3 period. Due to coincidence between T3, T*m*, B and F, GA3 opens, and tube G fires and puts out H. A mark is therefore applied to the store head which is a reversal of the condition received from the read head. A mark on EM2 indicates that a metering condition is on the P wire.

E1 is in the mark condition and therefore A will fire and B extinguish. C will fire and extinguish D because of coincidence between D, W*m* and T1 in GA11. T2 is ineffective. With A fired, when T3 is applied, H fires via GA7 and applies a space to the store head. Once again a reversal of the track condition has taken place. E2 is a space and B will fire. T1 and T2 have no effect. With B and FA fired, when T3 arrives, E is fired via GA8 and in turn fires EA and extinguishes F. When EA fires, FA is extinguished. However, as a result of the circuit in the cathode circuit of FA, the cathode potential of FA, which is applied to gate GA1, is not immediately removed. Therefore, gate GA1 opens owing to an effective coincidence of control potentials from B, FA, T3 and W*m*. This has caused another reversal to take place. The change-over to E and EA prevents further reversals.

E3 is a Mark, so A fires, extinguishing B. T1 and T2 are ineffective. T3 causes a pulse to be applied to G due to coincidence between A, E, T3 and W*m* in GA2. In this case there is no reversal. For the remainder of the track section, no reversals take place, the operation of the circuit being as described for normal transfer. On the second track section elements EM2 and E2 have therefore changed to Mark and E1 to Space. The other elements have not been changed. This means that the digit stored is 6 i. e., 0110. It will be seen that all digit elements up to and including the first space are reversed which is the condition required when adding 1 to a binary number. The fact that EM2 shows a Mark, indicates that no further addition must occur.

After about half a revolution of the track the section which has had its digits increased by 1, again comes under the read head. The chart for this operation is on the left hand side of Fig. 22. The meter pulse is still on the P wire; therefore, when element EM2 comes under the read head, D fires and extinguishes C. EM2 is in the "mark" condition; therefore A is fired. When pulse T2 arrives, F is not fired, as B was extinguished by the operation of A. With D and E fired, pulse T3 opens GA4 and fires G which extinguishes H. Therefore a Mark is applied to the store head. The next T1 pulse causes C to fire and D is extinguished. The operation of the circuit for the remainder of this section is the same as for normal transfer from the read to the store head with no reversals taking place. This means that both sections of track corresponding to L2 have now had "1" added i. e. both now read 6 and on both sections element EM2 is a mark condition.

When the meter pulse is removed from the P wire the operation of the circuit is as follows: see right hand side of Fig. 22. In this case, when the read head is passing EM2 there is no potential on the ST lead to fire D and C remains fired. Coincidence between C, T3 and T*m* apply a pulse to H via GA5. However, H is already fired and this is only included as a guard against false operation. H applies a space to the store head. Therefore EM2 has returned to the "space" condition, which indicates that another addition can take place. The remainder of the operation over this section of track is the same as for normal transfer.

The lead ER from the track control circuit, Fig. 18, is to ensure that H remains fired when the information is being read off to the element record circuit. With H fired, a space is applied to the store head. This space is overprinted on what is already on the track and effectively erases all the information of the particular section which corresponds to that being read off.

Fig. 23 is a trunking diagram of the whole system. This drawing should be read in conjunction with Fig. 15 which shows the circuits connected to each track. In the trunking diagram the amplifiers, track control, addition and mixing circuits are in one "box" labelled "Track Ccts."

The master control circuit, the binary-decimal converter, the printing circuit and the printer are common to all drums. The uniselector DS is a drum selector which connects the master control circuit to the required drum. There is one track selector TSA . . . TSJ, for each drum, its function being to connect (*a*) the master control circuit to the required track circuits and (*b*) the guard circuit to the required track circuits. The guard circuit is provided to prevent information being extracted from a section of track when there is a metering signal on the P wire corresponding to this section. The equipments individual to the various drums are identical.

In order to read off the number of calls registered per subscriber, the following sequence of operations takes place which will be described in detail later on.

DS connects the master control circuit to drum 1. When section 1 of track 1 is passing under the read head, a signal is applied to the track control circuits to switch the read head to the extract condition. The number stored on this section is transferred to the binary-decimal converter. After the last element of this section has passed the read head, the track control circuit is switched to the transfer condition. Also a signal is sent to the master control circuit to prevent any further start signals being applied to the track control circuit. Whilst, the information is being extracted from the drum, the master control circuit has sent to the printer the number of the subscriber's line. In this example we can assume that the number of the line is 1111, being the first section of the first track of the first drum. It is also assumed that a drum consists of 10 tracks, each track storing the number of calls made by 100 subscribers.

After the printing of the subscriber's number, the number of calls made by the subscriber is printed or otherwise recorded. When the printing is complete, a signal is sent from the printer to the master control circuit, causing it to give a signal to the track control circuit when the next section of the track is passing the read head. The number stored is read off and printed in the same manner. This sequence of operations continues until the last section of track has been dealt with. The track selector then steps to the next position and the stored information on this track is read off and printed.

When the last section of the 10th track of drum 1 has been read off, the drum selector steps to the next position and the information on the second drum is extracted in the same manner. In this way, the information on all drums is extracted and printed along with the subscribers' numbers. When this occurs, the master control circuit gives a finish signal and restores to its rest condition. The above will now be described in more detail. Figs. 24a, 24b, 25, 26, 27 and 28 show the master control circuit.

Figure 28:
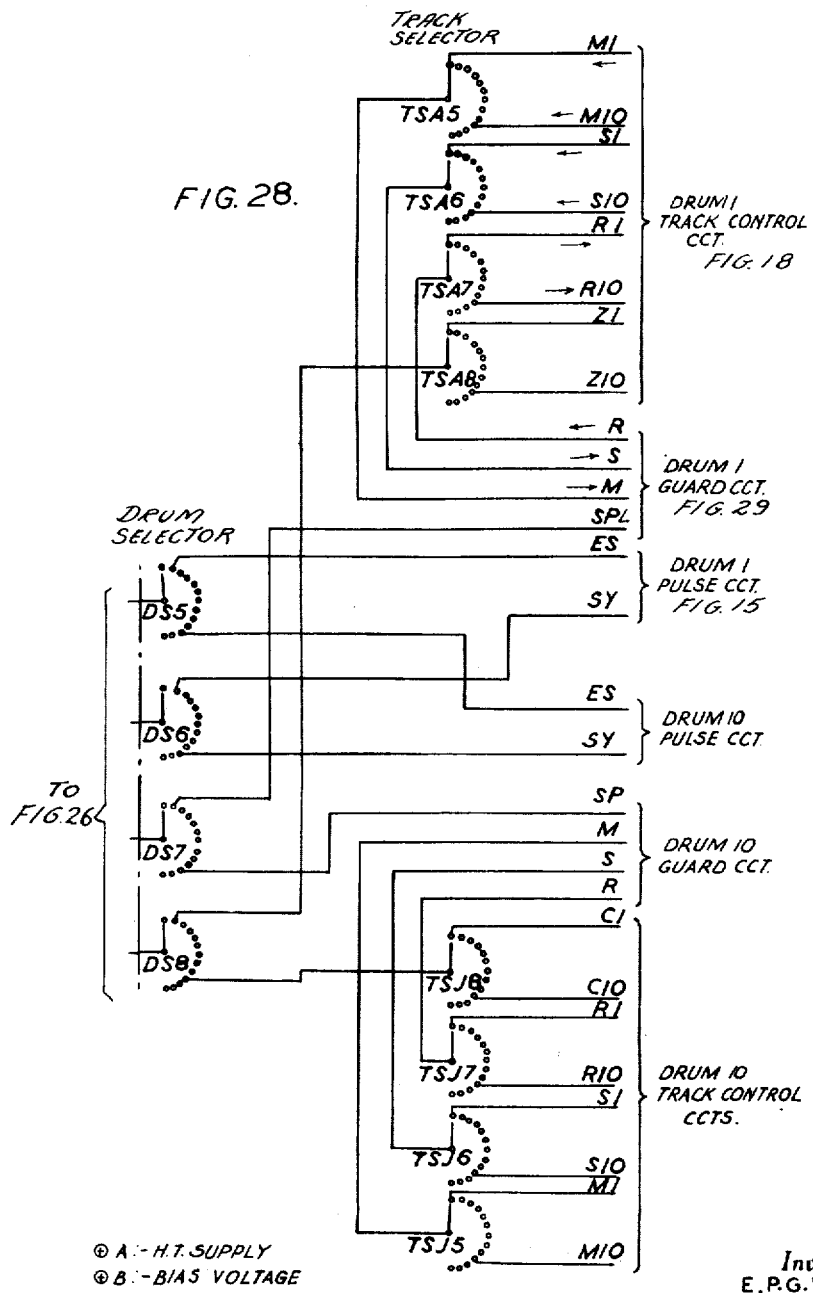

The first line to be read off will be the line corresponding to the first section of the first track of the first drum, i. e. subscriber 1111. DS, Fig. 28, is on its home position and TSA—the track selector of drum 1—on position 1. It is necessary that the master control circuit be synchronized with drum 1; therefore the pulses required for the operation of the control circuit counter are obtained over the ES lead from the drum pulse circuit, Fig. 16, via the DS5 bank and wiper of the drum selector DS of Fig. 28. Also, in order to lock the counter to the pulse circuit the SY pulse is used to start the counter and is derived from the drum pulse circuit via the DS6 bank and wiper of the drum selector DS of Fig. 28. In this way the pulses produced by the master control circuit counter are in alignment with the P1, P2 etc. pulses produced by the drum pulse circuit, Fig. 16.

Figure 24A:
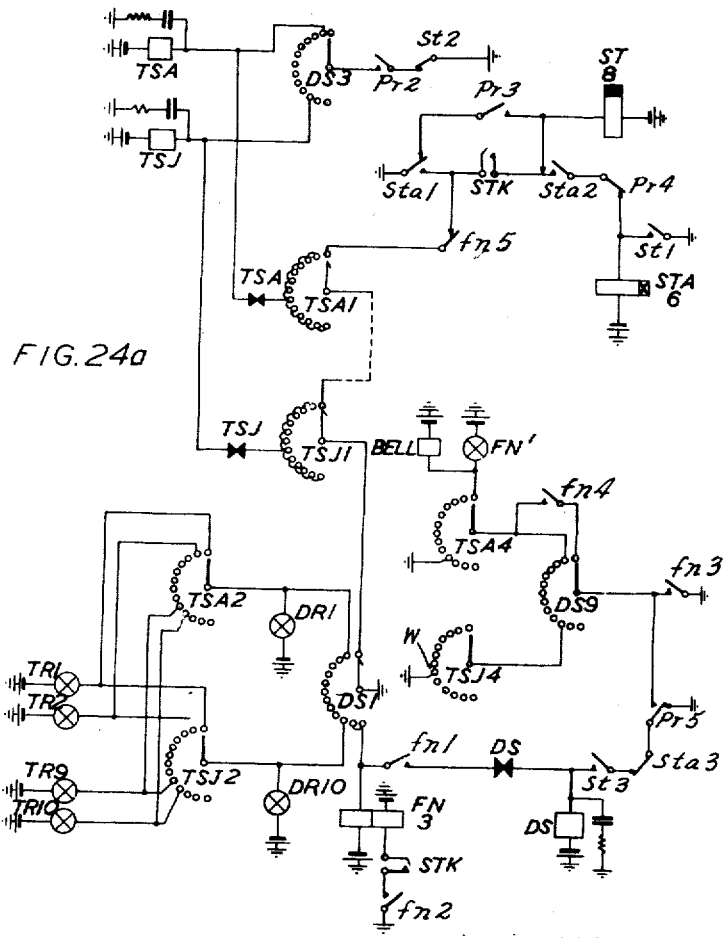
Figure 24B:
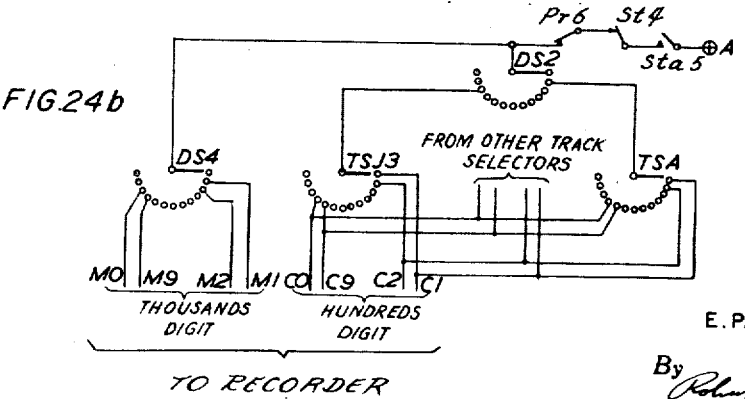

To start extracting the information from the drum, key STK, Fig. 24a, is operated. Earth from wiper DS1 via wipers TSJ1 . . . TSA1, normal contact fn5, make contact STK, break contact sta2, operates relay ST. Contact st1 operates STA slowly; st3 energizes the DS driving magnet via break contact of pr5. Make contact st5 (Fig. 25) connects a negative potential to the cathodes of tubes CS, P100 (Fig. 26) and S1 (Fig. 27). Contact st8 fires CT, Fig. 26, but not until STA is operated by make contact st1. Make contacts sta1 and sta2 complete a holding circuit for STA; break contact sta2 releases ST slowly; sta3 breaks the DS magnet circuit, causing DS to step to position 2; sta4 connects the H. T. voltage to the tubes (with the exception of CT and ET). With DS on position 2, lamp DR1, Fig. 24a, glows, indicating that drum 1 circuits are connected to the master control circuit, and TR1 also glows, indicating that track 1 is connected. Tubes CS, P100 and S1 fire due to the negative potential on their cathodes. When ST releases, a marking potential is applied via make contact sta5, break contact st4, break contact pr6 and wipers DS4, DS2 and TSA3 to leads M1 and C1 to the recording equipment. Also, as S1 is fired a potential is applied to lead 11, Fig. 27. These marking potentials inform the recording equipment that the number to be read off is 1111. The counter and the distributor have now been set with tubes P100 and S1 fired. The trigger of SC is connected to the SY lead of drum 1 through the break contact st7 and wiper DS6, Fig. 28.

When the first SY pulse arrives, SC is fired and prepares a gating circuit GA24 for gating the ES pulses to the counter. The first ES pulse to arrive after SC is fired is applied to the common pulse lead of the counter. As P100 was previously fired, P1 is biased and thus on the arrival of the first ES pulse, P1 fires and extinguishes P100. With P1, S1 and CS fired and a pulse on the ES lead, a signal is applied via gate GA24, and via gate GA29, DS8 and TSA8 to the Z1 lead. This lead is connected to the Z lead of the track 1 control circuit, Fig. 18. This same pulse is also applied over lead SLX (bottom of Fig. 26) to the ST lead (top of Fig. 27) to the printer control circuit to give this circuit a start signal, and it now causes the subscriber's number to be printed.

This pulse is applied as the ES element of the section is passing under the read head, Fig. 16.

The pulse from Z1 lead of the master control circuit (Fig. 28) is applied to the Z lead of the track control circuit (Fig. 18) at the instant the ES element of this subscriber's section is passing under the read head. Tubes XA and XB in the track control circuit, Fig. 18, fire and extinguish tubes RA and RB, thus closing the gates RS, RM (Fig. 18) to the addition circuit, Fig. 19. The gates XS and XM (Fig. 18) are opened by XA, and the pulses from the read head amplifier are passed via leads M and S to the track selector (Fig. 28) through track selector switches TSA5 and TSA6 to the guard circuit Fig. 29, via leads S, M, and through the gates of the guard circuit (Fig. 29) in a manner to be described to the binary-decimal converter (Figs. 30 and 31) via leads STL and SPL. A positive potential is applied to the ER lead (Fig. 18) by XB. This potential is fed to the addition circuit, Fig. 19, in order to erase the information on the section of track passing under the record head.

When the last digit has been sent via the guard circuit (Fig. 29), a signal is applied, as described below, to the R lead which passes through the track selector TSA7 (Fig. 28) to the track control circuit (Fig. 18) and fires RA and RB which extinguish XA and XB. The circuit is now in the condition to allow transfer between the read and store heads.

As stated, when information on a particular section has to be read off, the output from the read head amplifier is gated via the track control circuit, Fig. 18, the track selector circuit, Fig. 28, to the guard circuit, Fig. 29. If element EM of the appropriate section is a Space, GS fires (if it is not already fired) via "space" lead S due to coincidence between Tm, T2, and the signal from the track control circuit. GS causes ST to fire when T3 arrives and ST primes MG. Each "mark" signal which is applied to the M lead is therefore gated through MG to the binary-decimal converter via lead PSL. ST applies a start condition to the converter circuit over lead STL.

If, on the other hand, the signal in position EM is a mark, which indicates that a metering condition is on the P wire of the subscriber whose section is being read off, it is not desirable to continue. Under this condition GM is fired instead of GS, when pulse T2 is applied. GM extinguishes GS and applies a signal to the R lead of the track control circuit (Fig. 18) through the track selector TSA7 of Fig. 28. This, as previously described, operates tubes RA, RB, Fig. 18, to open gate tubes RS, RM, and switches the read head output to the addition circuit (Fig. 19). When the metering condition has been removed from the P lead and element EM restored to space, the stored information will be transferred to the binary-decimal converter when that storage section next comes under the read head.

A mark condition on the element indicates the presence of a digit. By transferring the mark condition to the converter, the number on the drum is transferred to the converter where a binary counter is set as described below. When the last element of the appropriate section has been scanned by the read head, SP fires in the guard circuit of the drum (Fig. 29) due to coincidence between T3 and E14. ST is extinguished. At the instant SP fires, a pulse is applied via leads SPL to both the master control circuit (Fig. 26) through the drum selector DS7 (Fig. 28) and binary-decimal converter (Figs. 30 and 31), indicating that the last element of the track section has been read off. SP also applies a condition to the R lead of the track control circuit (Fig. 18) via the track selector TSA7 (Fig. 28) to cause the read head output to be switched to the addition circuit by operation of tubes RA, RB, Fig. 18, and the opening of gates RS, RM.

When the last element of the section is passing the read head, the stop pulse is applied from the SP lead of the guard circuit (Fig. 29) by the coincidence of T3 and E14, via DS7, Fig. 28, to fire tube ES, Fig. 26, thus extinguishing CS. With CS extinguished it is not possible to send the start pulse via the Z lead.

If a metering signal is on the P wire of the subscriber whose section is being read off when the start signal is applied, the information on the drum is not transferred to the binary-decimal converter, due to the action of the guard circuit. Therefore the stop pulse is not applied to the SP lead, and when the counter has finished a complete count, another start pulse is applied to the Z lead of the track control circuit. It should be mentioned that the counter P1 . . . P100, Figs. 25 and 26, takes one step (see the waveforms of Fig. 2) as each subscriber's section passes under the read head under control of the ES pulses via wiper DS5, Fig. 28, from the drum pulse circuit DPC (Fig. 15).

Figure 27:
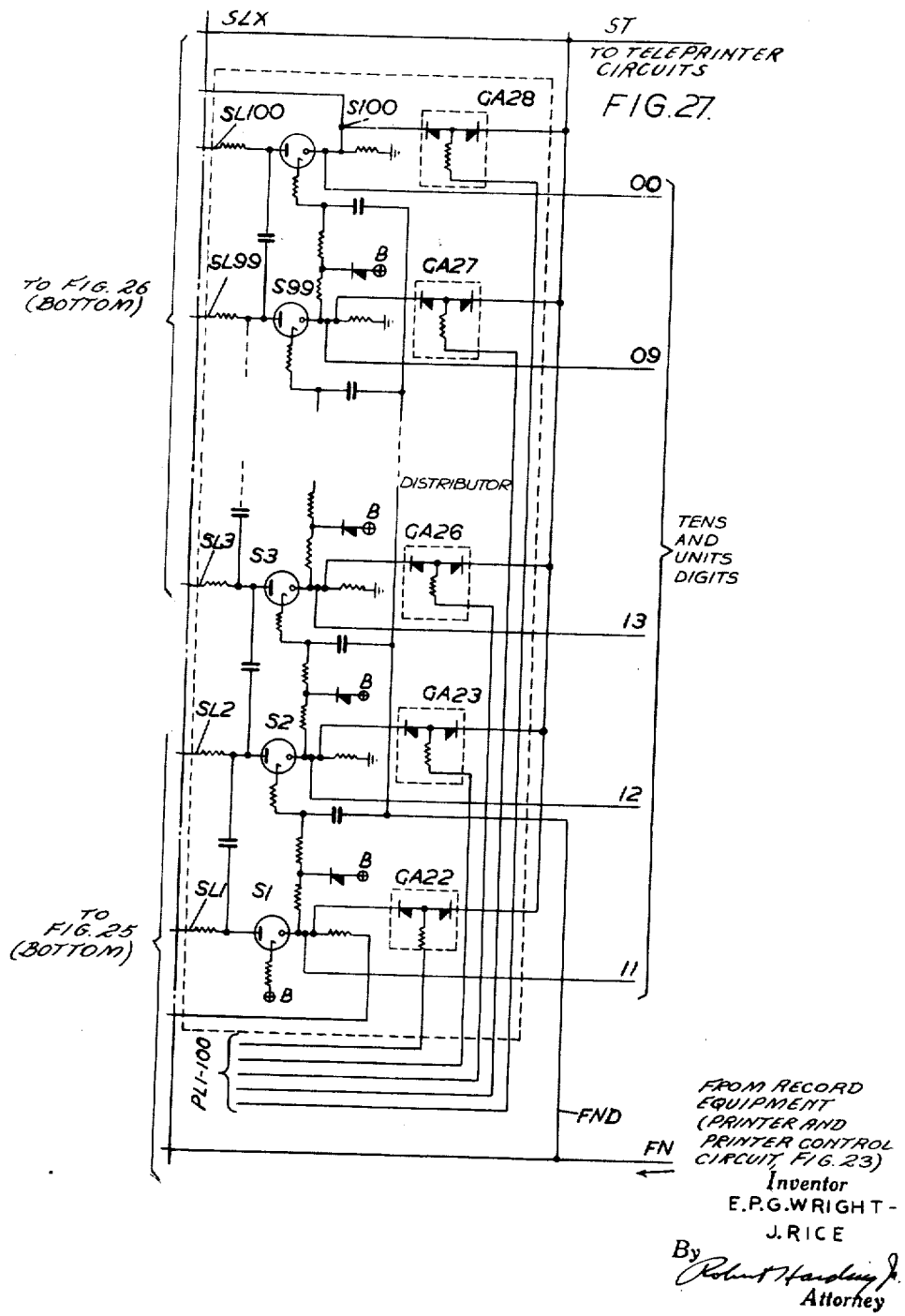

The record equipment will be arranged to give a signal over lead FN, Fig. 27, from the printer control circuit (Fig. 23) when the required information has been recorded, i. e. the subscriber's number and the number of calls. This pulse passes over lead FN of Fig. 25 to the gate GA21 (Fig. 26) and fires CS which extinguishes ES. This pulse also steps the distributor (Fig. 27) via lead FND and S2 fires, extinguishing S1. Lead 12 to the recording equipment is now marked to indicate tens and units digits 12 and the marking potential removed from 11. The second section of track can now be read off. With coincidence between S2, P2, gate GA23 (Fig. 27) opens and will coincidence between CS and an ES pulse via DS5 (Fig. 28), gate GA29 (Fig. 26) opens. By coincidence of the opening of these two gates, the start signal is sent to the teleprinter circuits via lead ST, Fig. 27; in this case when the second section of track is passing under the read head. When the information relevant to this section has been recorded, the distributor is stepped and the next section read off. The ES pulses are produced by the pulse generator to coincide with each ES element of the track. These pulses are represented in Fig. 16. Each ES pulse appears just prior to a TM pulse.

The above sequence of operations continues until the last section of track is reached. In this position S100, Fig. 27, is fired. When the stop signal is received, via lead SPL, Fig. 28, wiper DS7, ES fires as before. Also, due to coincidence between S100 and the stop pulse, on gate GA25, Fig. 26, ET fires and CT is extinguished. When the end of record signal is received, via FN, FND, tube PT (Fig. 25) fires and relay PR operates. The distributor does not step, as there is no coupling between S100 and S1; neither does CS fire, as CT was extinguished and therefore gate GA21 cannot open.

Contact pr1 prepares a holding circuit for Pr. Earth, via. break contact st2, make contact pr2, wiper DS3, energizes magnet TKA of switch TSA1 . . . 8. Contacts pr4 open and release STA. Contacts pr6 open and remove the marking potential via wipers DS4, TSJ3 from the thousands and hundreds digit leads to the recorder. When STA has released and opened contacts sta4, Fig. 25, all of the fired tubes with the exception of ET are extinguished. With STA released, ST is re-operated over break contact sta1 and in turn re-operates STA via make contact st1. Break contact st2 opens and causes TSA to step to position 2. Make contact st5 pre-sets the counter and distributor by energizing tubes P100 (Fig. 26) and S1 (Fig. 27). On the operation of STA, PR is released by the opening of break contact sta6. ST is also released since contacts sta1 and 2 are both open, and the circuit is ready to extract the one hundred subscriber meter readings stored on the second track which is now read off as previously described. The rest of the tracks on drum 1 are read off in turn in the same manner.

As TSA steps, the hundreds digit marking potential is applied to the appropriate lead via TSA3. Also the appropriate lamp indication is given. When the last section of the $n$th track is reached, PR is operated as before. With PR and ST operated, and STA unoperated, DS steps to position 3, via tsa4 and DS9, to earth on its $n$th contact. The earth on bank 4 of any of the track selectors TSA is connected to a contact $n$ depending upon the number of tracks in use. The master control circuit is now connected to drum 2. Lamp DR2 (not shown) now glows with lamps TR1, indicating track 1 of drum 2. The marking potential is on leads M2 and C1, indicating a group of numbers 21 . . .

The operation of the circuit is the same as previously described until the last section of drum 10 is reached, i. e. all the information on all drums has been read off. It is assumed that there are ten drums in the exchange, the numbers of drums depending upon the capacity of the exchange.

When the last section of drum 10 has been read off, PR operates and steps DS to position 12. Relay FN operates over wiper DS1. Make contact fn1 provides a homing circuit for DS which drives to position 1. Contact fn2 locks FN dependent upon key STK. Make contacts fn3 and fn4 prepare a Finish Alarm Circuit which operates lamps FN' and the bell when switches TSA, DS are home. Break contact fn5 permits re-operation of ST vit TSA1, TSJ1, DS1 wipers. When wiper DS1 reaches its home contact, an earth is extended via wiper TSJ1 to the TSJ magnet, and TSJ homes. The remaining TS uniselectors home in sequence, TSA being the last to do so. With TSA home, the Finish Alarm is given, STK is restored by the operator, and relays FN and STA release.

The circuit of the master control circuit does not show facilities for reading off one selected line. The circuit can be modified to include this feature by arranging to position DS and the appropriate track selector, and also to fire the distributor tube corresponding to the tens and units digits of the required number. The start signal is then applied to the track control circuit. After the information has been recorded, the master control circuit is released.

The object of the binary-decimal converter, Figs. 30, 31 and 32, is to receive the number recorded on the drum, which is in binary notation, and transfer it into decimal notation in order that the number of calls recorded on any section can be transferred to recording equipment in decimal form. The converter consists essentially of a binary counter, Fig. 30, a group of flip-flops, Fig. 31, and a decimal counter, Fig. 32.

On the firing of tube ST in the guard circuit, Fig. 29, a potential is applied to lead STL causing tube TST, Fig. 31, to fire. TST fires TTA and applies a pulse to the triggers of the tubes X1 . . . X4 (Fig. 30) causing them to strike, if for some reason they are not in the fired condition. Pulses are received over the PSL lead (Fig. 30) from the guard circuit (Fig. 29). Connected to the trigger cicuits of each Y tube is a coincidence network. Each pair of tubes in the binary counter correspond to an element of the drum, i. e. tubes X1 and Y1 correspond to element E1, tubes X2 and Y2 correspond to element E2, etc. Fig. 30 shows the tubes corresponding to the first four elements. Assume that the first four elements received are 0101 in binary form. As the first element E1 passes the read head, a pulse will appear on lead PSL. Pulse E1 is on as the first element E1 passes the read head; therefore Y1 will fire. There will be no pulse on PSL during E2 and Y2 will not fire. Y3 will be fired during E3, but Y4 will not strike as the fourth element passes the head. With Y1 and Y3 fired, X1 and X3 will be extinguished, i. e. the number stored on the appropriate section of the drum will be set up on the Y tubes of the counter.

When the last element of the section has been read off, a pulse is applied to the SPL lead, Fig. 31, by the guard circuit (Fig. 29), and tube TSP fires, causing TST to be extinguished. With TTA and TSP fired, PST strikes and a start signal is applied to the pulse generator via lead PGT. Pulses of suitable frequency and amplitude are then applied to lead PUL (Fig. 30). Negative pulses are also applied to lead PUN (Fig. 32) to step the decimal counter in synchronism with the binary counter.

It will be assumed that the digit applied to the counter was 5, i. e. 0101 in binary notation. Therefore tubes Y1, X2, Y3, X4 and the remainder of the X tubes are fired. The first PUL pulse fires X1 and Y1 is extinguished. The second pulse fires Y1 again; Y2 is fired via gate YG2 under control of X1, X2; X3 is fired via gate XG3 under control of X1, X2, Y3. X1, X2 and Y3 are extinguished. Pulse 3 fires X1 only, and Y1 is extinguished. Pulse 4 fires Y1 and X2 fires via gate XG2 under control of X1 and Y2, thus extinguishing X1 and Y2. The fifth pulse fires X1 and Y1 is extinguished. The counter is now in the condition that all X tubes are fired, which is the "Finish Counting" condition. When TSP and all X tubes are fired, TFG fires and extinguishes TTA. TFG also strikes PSP which extinguishes PST. PSP gives a signal to the printer control circuit (Fig. 23) via the PR lead, indicating that the counting is complete. With PST extinguished, the start condition is removed from the pulse generator which stops sending pulses to the PUL and PUN leads.

The decimal counter has also been stepped by the five pulses sent by the pulse generator. In the event of a section of track being read off, on which nothing is stored, i. e. a spare number, none of the Y tubes are fired. In this case when TSP is fired, TFG and PST are also fired. TFG in turn fires PSP which extinguishes PST. With a delay in the pulse generator, the sending of pulses can be prevented although a start signal of short duration may be received by the pulse generator.

The decimal counter (Fig. 32) consists of a number of multi-cathode tubes connected in tandem. TU is the units tube, TD the tens, TC the hundreds etc. Only two such tubes are shown on the drawing. To read 9999 calls, the capacity of existing message registers, four such multi-cathode tubes will be required. The home position of each tube is the 1st cathode K1. Associated with each of the tubes, TU, TD and TC is a gating tube GU, GD and GC respectively. When the start key STK of the master control circuit is thrown, a potential is applied by one contact shown in Fig. 32, to the trigger of GU. At the start of the count, TU, TD and TC are each fired on K1. This represents 000 (in decimal notation). As each pulse is received, TU takes one step. After 9 pulses have been received, TU has stepped to K10, representing 9. On this position GD is primed and the 10th pulse will therefore step TU to K1 and will also be gated through GD to step TD to K2 representing 10. In a similar manner TD steps on every tenth pulse. After 99 pulses TU has K10 fired and TD has K10 fired. Tubes GD and GC are primed and when the 100th pulse is received, TU steps to K1, TD steps to K1 and TC to K2. Similarly TC steps on every 100th pulse. Therefore with the three tubes shown, a total of 999 can be registered.

The cathodes of the three tubes TU, TD and TC are connected through to the record or printer control circuit. The ten cathodes of TU denote the units digits, those of TD the tens digits and those of TC the hundreds digits, according to the positioning of the tubes, so the number of calls can be read in decimal notation. This decimal information can be translated into teleprinter code, as previously described, and printed.

The number of pulses applied to the decimal counter is the number required to drive the binary counter to its "home" position, i. e. all X tubes fired.

When all the information relating to a particular subscriber has been printed, the printer control circuit applies a signal to the master control circuit on the FN lead (Fig. 27). Similarly a reset signal is applied to the reset lead of the binary-decimal converter to fire each tube over its K1 cathode, this being the start position for each count.

As decribed above, the decimal equivalent of the number stored on the drum is set up on tubes TU, TD, etc. The cathodes of these tubes are connected to the printer control circuit. The master control circuit identified the number of the subscriber connected to the section of track being read off.

Simple selection equipment will first determine the number of the subscriber from the master control circuit and print this number. When this has been printed and a signal received from the converter over the PR lead, Fig. 31, indicating that the conversion is complete, the number stored on tubes TU, TD, TC etc. is printed. When this has been printed, the printed control circuit will give a finish signal to the master control circuit and a reset signal to the converter. The equipment is now ready to deal with the next section of the track.

The mixer circuit, Fig. 17, contains a tube MV1, not so far mentioned. This tube enables the drum pulse circuit and the read and store amplifiers to be switched on only when the condition of the track is to be changed, i. e. on receipt of a metering signal.

MV1 is added to each mixing circuit, and is connected via blocking rectifiers to each metering lead. When a metering signal is applied, MV1 conducts and a potential is developed at its cathode. This potential applies a start signal to the read and re-store amplifiers of the track (Fig. 15) and also to the common drum pulse circuit. Therefore these circuits function when a metering signal is applied to any one or more of the hundred P wires. When there is no metering signal on the leads, MV1 cuts off. It is therefore necessary that the time taken for one revolution be less than the minimum time of the metering signal, i. e. the minimum rotational speed of the drum be 600 R. P. M.

The master control circuit can be arranged to cause tube MV1 of the appropriate mixing circuit to conduct when it is required to read off the information on the track corresponding to the mixing circuit.

It will be seen that with the magnetic drum, an item of intelligence read, and if desired modified, can be re-stored either in a second storage section allocated to said item or in the same portion from which it was extracted. In the mercury delay line (Fig. 13), an item extracted from the outgoing end of the line is re-inserted at the incoming end. In the cathode ray tube (Fig. 14), as clearly brought out in the above-mentioned article, the ray remains on a spot for a definite time period and this is sufficient for a binary element to be read via the end-screen and passed back either the same or inverted to the input oscillator, so as to be applied via the ray to the same spot either to re-inforce the existing condition, or to "overprint" it with the opposite condition.

It will be seen that each number or other item of intelligence is read binary element by binary element, that if desired the number is modified, element by element, after which the number is re-stored, the whole series of operations taking place for one number or item before commencement of reading of the next.

The numbers stored on the drum tracks and the corresponding metering leads are continuously and synchronously scanned and the number is modified if a corresponding metering condition exists. Intelligence from two different groups of sources, the drum track sections and the metering leads are continuously read, and an output obtained depending on the combined intelligence from each track section and its corresponding metering lead, or external control. The form of the output is also controlled by the EM condition carried by each stored number: if an EM pulse is present, it prevents modifications of the number by a metering signal because the pulse records that the metering pulse has already been responded to.

Each drum track may constitute a set of telephone subscribers' message registers, which can be read electrically and the reading statistically represented, that is, printed or otherwise recorded in column form, suitable for a permanent record.

A single track could of course be carried by a disc, which should be taken to include an annulus. A magnetic tape or wire, preferably endless, could also be used.

Although modification of a number by adding 1 has been described, any other modification of a number or any modification of any other item of intelligence is within the scope of the invention.

While the principles of the invention have been described above in connection with specific embodiments, and particular modifications thereof, it is to be clearly understood that this description is made only by way of example and not as a limitation on the scope of the invention.

We claim:

1. In a telecommunication switching system wherein each successive message unit chargeable to a subscriber is indicated by a discrete signal impressed upon a conductor assigned to said subscriber, a memory device having a plurality of signal storage sections, each for storing a plurality of signals representing a number which in turn represents a cumulative total of message units chargeable to a subscriber, means for repeatedly reading the signals stored in one of said sections assigned to a particular subscriber, a conductor assigned to said particular subscriber, means for detecting the presence on said conductor of an operating signal indicating a chargeable message unit, computing means connected to said reading means and to said detecting means and responsive to the first coincidence of an operating signal detected by said detecting means and a reading operation of said reading means for modifying the signals read by said reading means, means for recording a registration of said modified signals in said one section of said memory device, and means including said reading means for rendering said computing means inoperative upon subsequent coincidences of the same operating signal detected by said detecting means and a reading operation of said reading means and for causing said recording means to record the signals read by said reading means in said one section of said memory device.

2. In a telecommunication switching system wherein each successive message unit chargeable to a subscriber is indicated by a discrete electric operating signal impressed upon a conductor assigned to said subscriber, a memory device having a plurality of signal-storage sections, each for storing a plurality of signals representing a number which in turn represents a cumulative total of message units chargeable to a subscriber, means for reading the signals stored in one of said sections assigned to a particular subscriber, a conductor assigned to said particular subscriber, means for detecting the presence on said conductor of an operating signal indicating a chargeable message unit, computing means connected to said reading means and to said detecting means and responsive to said detecting means for modifying the signals read if said operating signal is present, means for impressing upon said one section a registration of the modified signals, means for repeating periodically said signals-reading operating, signal detecting, signals-modifying, and registration-impressing operations at a repetition rate greater than the rate at which successive operating signals are impressed upon said conductor, whereby the signals stored in said one section represents the cumulative total of the message units chargeable to said subscriber, a signals-recorder, means for entering into said recorder the signals read from said one section, and means responsive to said detecting means for inhibiting said signals-entering means when said operating signal is present on said conductor.

3. A telecommunication switching system as claimed in claim 2 and further comprising means for enabling said signals entering means again when said operating signal is no longer present on said conductor.

4. In a telecommunication switching system wherein each successive message unit chargeable to a subscriber is indicated by a discrete electric operating signal impressed upon a conductor assigned to said subscriber, a plurality of subscribers' lines, a memory device having a like plurality of signals-storage sections, each for storing plurality of signals representing a number which in turn represents a cumulative total of message units chargeable to one of said subscribers, means for reading in succession the signals stored in said sections, a like plurality of conductors each assigned to one of said subscribers' lines, means for concurrently detecting the presence on corresponding ones of said conductors of operating signals each indicating a chargeable message unit, computing means responsive to said detecting means for modifying said read signals if said operating signal is present on the corresponding conductor, means for impressing in succession upon said sections registrations of said modified signals, means for repeating periodically said signals-reading, operating signal-detecting, signals-modifying and registration-impressing operation at a repetition-rate greater than the rate at which successive operating signals are impressed upon any one of said conductors, whereby the signals stored in said memory device represent the cumulative totals of the message units severally chargeable to said subscribers, a signals-recorder, means for entering into said recorder in succession the signals read from said sections, means responsive to said detecting means for inhibiting said signals-entering means when said detecting means detects the presence of an operating signal on one of said conductors and for enabling said signals-entering means again only when said detecting means detects that said operating signal is no longer present, whereby the order in which the signals read from said sections are entered into said recorder remains unchanged.

5. A telecommunication switching system, as claimed in claim 4, in which the means for concurrently detecting operating signals on corresponding ones of the conductors comprises means for scanning said plurality of conductors, and further comprising means for inhibiting the registration-impressing operations when no operating signal is present on any one of said conductors.

6. In a recording system a plurality of conductors, a continuously rotating memory device having a plurality of signals storage sections equal to twice the number of said conductors arranged in a circular path, so as to pass a given point successively, each section for storing signals representing a number, each pair of oppositely disposed sections being assigned to a different one of said conductors, reading means positioned adjacent said path and arranged to read the signals stored in said sections, as said sections pass said reading means, recording means positioned opposite to said reading means, so that a storage section is passing said recording means when the other section assigned to the same conductor is passing said reading means, said recording means arranged to record signals on said sections, means detecting the presence of an operating signal on a conductor when a section assigned to that conductor is passing said reading means, computing means connected to said reading means and to said detecting means and responsive thereto for modifying the signals read by said reading means, means responsive to said computing means for causing said recording means to record the modified signals in the other section assigned to the same conductor, which section is then passing said recording means, registering means operative when both sections assigned to the same conductor have had modified signals recorded thereon, and means including said reading means and connected to said detecting means and to said registering means and responsive to the operation of said registering means for inhibiting the operation of said computing means and causing said recording means to record the same signals read by said reading means in the section then passing said recording means.

7. In a recording system, the combination, as claimed in claim 6, further comprising means for enabling the computing means when said operating signal is removed from said conductor.

8. In a recording system, the combination, as claimed in claim 7, in which the registering means comprises a portion of each signals storage section positioned in said section so as to pass the reading or recording means before the signals storage portion of said section.

References Cited in the file of this patent

UNITED STATES PATENTS

| | | |
|---|---|---|
| 2,467,566 | Potts | Apr. 19, 1949 |
| 2,549,071 | Dusek | Apr. 17, 1951 |
| 2,585,630 | Crosman | Feb. 12, 1952 |
| 2,588,375 | Flint et al. | Mar. 11, 1952 |
| 2,609,143 | Stibitz | Sept. 2, 1952 |
| 2,611,813 | Sharpless et al. | Sept. 23, 1952 |
| 2,629,827 | Eckert et al. | Feb. 24, 1953 |
| 2,671,607 | Williams et al. | Mar. 9, 1954 |
| 2,675,427 | Newby | Apr. 13, 1954 |
| 2,679,551 | Newby | May 25, 1954 |
| 2,700,148 | McGuigan et al. | Jan. 18, 1955 |
| 2,701,095 | Stibitz | Feb. 1, 1955 |
| 2,738,382 | Brooks et al. | Mar. 13, 1956 |

OTHER REFERENCES

"24 Digit Parallel Computer With Magnetic Drum Memory. Examples of Coding Prototype Design Plans," published by Engineering Research Inc., St. Paul, Minn., as an enclosure to Final Report on Contract CST–10133. Dated Feb. 15, 1949. Figures 3.2–2, 3.3–1, 3.3–2, 3.3–11, 3.4–1, 3.4–4 and pages 4 and 24–31.

"Design Features of the ERA 1101 Computer," by F. C. Mullaney. Published in Electrical Engineering November 1952, pages 101–1018.

"Universal High-Speed Digital Computers; a Small-Scale Experimental Machine," by Williams et al.; Proceedings of the Institute of Electrical Engineers, February 1951, pages 13–34.

"A Magnetic Digital Storage System," by Booth; Electronic Engineering, July 1949, pages 234–238.

"Proceedings of a Second Symposium on Large-Scale Digital Calculating Machinery," Sept. 13–16, 1949, published by Harvard University Press, Cambridge, Mass. Pages 11–19.